US012682832B2

(12) United States Patent
Deng et al.

(10) Patent No.: US 12,682,832 B2
(45) Date of Patent: Jul. 14, 2026

(54) DISPLAY DEVICE AND DETECTING METHOD THEREOF, PIXEL DRIVING CIRCUIT

(71) Applicant: AUO Corporation, Hsinchu City (TW)

(72) Inventors: Ming-Yang Deng, Hsinchu City (TW); Ching-Yang Cheng, Hsinchu City (TW); Che-Chia Chang, Hsinchu City (TW); Ming-Hung Chuang, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/914,298

(22) Filed: Oct. 14, 2024

(65) Prior Publication Data

US 2025/0209971 A1 Jun. 26, 2025

(30) Foreign Application Priority Data

Dec. 26, 2023 (TW) ................................ 112150856

(51) Int. Cl.
*G09G 3/32* (2016.01)

(52) U.S. Cl.
CPC ....... *G09G 3/32* (2013.01); *G09G 2300/0842* (2013.01); *G09G 2320/0233* (2013.01); *G09G 2330/021* (2013.01); *G09G 2330/04* (2013.01); *G09G 2330/12* (2013.01)

(58) Field of Classification Search
CPC ... G09G 3/32-3291; G09G 2300/0421; G09G 2300/0426; G09G 2300/0809; G09G 2300/0819; G09G 2300/0842; G09G 2300/0852; G09G 2310/0243; G09G 2310/06; G09G 2310/08; G09G 2320/0233; G09G 2320/029; G09G 2320/0295;

(Continued)

(56) References Cited

U.S. PATENT DOCUMENTS

| | | | | |
|---|---|---|---|---|
| 10,004,124 | B1 * | 6/2018 | Ko | G09G 3/14 |
| 11,335,248 | B1 * | 5/2022 | Huang | G09G 3/32 |
| 11,900,844 | B1 | 2/2024 | Lin et al. | |

(Continued)

FOREIGN PATENT DOCUMENTS

| | | | |
|---|---|---|---|
| CN | 105405399 | A | 3/2016 |
| TW | 202029162 | A | 8/2020 |
| TW | I848658 | B | 7/2024 |

*Primary Examiner* — Nathan Danielsen
(74) *Attorney, Agent, or Firm* — WPAT, PC

(57) ABSTRACT

A display device includes multiple pixel driving circuits coupled in series. A first pixel driving circuit of the multiple pixel driving circuits includes a first switch, a capacitor and an accommodation space. A first terminal of the first switch is configured to output the detecting signal. A second terminal of the first switch and a first terminal of the capacitor are coupled to a first node. A second terminal of the capacitor and a first terminal of the accommodation space are coupled to a second node. A second terminal of the accommodation space is configured to receive a reference signal. The accommodating space is configured to accommodate a light-emitting element after a detecting operation. During the detecting operation, an electrical relation between the first terminal of the accommodation space and the second terminal of the accommodation space is determined based on the detecting signal.

13 Claims, 12 Drawing Sheets

200

(58) Field of Classification Search
CPC ....... G09G 2320/0693; G09G 2330/04; G09G 2330/10; G09G 2330/12
See application file for complete search history.

(56) References Cited

U.S. PATENT DOCUMENTS

| | | | | |
|---|---|---|---|---|
| 2017/0053577 | A1* | 2/2017 | Cao | G09G 3/006 |
| 2018/0005570 | A1 | 1/2018 | Wang | |
| 2018/0061316 | A1* | 3/2018 | Shin | G09G 3/3275 |
| 2020/0052033 | A1* | 2/2020 | Iguchi | G09G 3/32 |
| 2021/0366397 | A1* | 11/2021 | Na | G09G 3/3291 |

* cited by examiner

300

400

600

700

900

DISPLAY DEVICE AND DETECTING METHOD THEREOF, PIXEL DRIVING CIRCUIT

CROSS-REFERENCE TO RELATED APPLICATION

This application claims priority to Taiwan Application Serial Number 112150856, filed Dec. 26, 2023, which is herein incorporated by reference in its entirety.

BACKGROUND

Field of Invention

The present disclosure relates to a display technology. More particularly, the present disclosure relates to a display device, a detecting method of the display device, and a pixel driving circuit.

Description of Related Art

In the array test (AT) of a micro light emitting diode (μLED) display panel, if a short defect occurs in a μLED, the AT can only detect the X address thereof and cannot detect the Y address thereof, which leads to be unable to find the μLED in which the short defect occurs. Therefore, how to make design to solve the problem mentioned above is an important issue in this field.

In the μLED display circuit, the usually used are the oxide thin-film transistors (oxide TFTs) to work as driving TFTs that determine the magnitude of the currents in the pixels. However, the oxide TFTs is more sensitive to the factors such as water vapor, bias voltage, and temperature, which makes the pixel currents easily influenced by the variation of threshold voltages of the oxide TFTs to lead to the brightness non-uniformity of the display screen (i.e., mura). Therefore, how to make design to solve the problem mentioned above is an important issue in this field.

SUMMARY

Embodiments of the present disclosure include a display device. The display device includes multiple pixel driving circuits coupled in series. A first pixel driving circuit of the multiple pixel driving circuits includes a first switch, a capacitor, and an accommodation space. A first terminal of the first switch is configured to output a detecting signal. A second terminal of the first switch is coupled with a first node. A first terminal of the capacitor is coupled with the first node. A second terminal of the capacitor is coupled with a second node. A first terminal of the accommodation space is coupled with the second node. A second terminal of the accommodation space is configured to receive a reference voltage signal. The accommodation space is configured to accommodate a light-emitting element after a detecting operation is executed. The reference voltage signal is adjusted and the electrical relation between the first terminal of the accommodation space and the second terminal of the accommodation space is determined according to the detecting signal, when the detecting operation is executed.

Embodiments of the present disclosure include a detecting method of a display device, including: during a first period, providing a reference voltage signal having a first voltage level to a first node; generating a detecting signal from a third node, according to a voltage level of a second node; during a second period, adjusting the reference voltage signal to a second voltage level different from the first voltage level; comparing a first detecting voltage level of the detecting signal during the first period with a second detecting voltage level of the detecting signal during the second period; determining an electrical relation between the first node and the second node, according to a difference between the first detecting voltage level and the second detecting voltage level; coupling a light-emitting element between the first node and the second node, when the electrical relation meets a default electrical relation, wherein a capacitor is coupled between the second node and the third node.

Embodiments of the present disclosure include a pixel driving circuit. The pixel driving circuit includes a first switch, a second switch, a light-emitting element, and a third switch. A first terminal of the first switch is coupled to a first node. A second terminal of the first switch is configured to receive a first reference voltage signal. A first terminal of the second switch is coupled to the first node. A second terminal of the second switch is coupled to a second node. A control terminal of the second switch is coupled to a third node. A first terminal of the light-emitting element is coupled to the second node. A first terminal of the third switch is coupled to the first node. A second terminal of the third switch is coupled to the third node.

Embodiments of the present disclosure include a detecting method of a display device, including: during a first period, turning on a first switch coupled between a first terminal of an accommodation space and a node outputting a detecting signal; turning on a second switch coupled between the node and an electrical testing device; inputting a reference voltage signal maintaining at a first voltage level into a second terminal of an accommodation space; and detecting the detecting signal and generating a first detecting result, by the electrical testing device. During a second period, adjusting the reference voltage signal from the first voltage level to a second voltage level that is different from the first voltage level; detecting the detecting signal and generating a second detecting result, by the electrical testing device; and determining an electrical relation between the first terminal and the second terminal, according to a difference between the first detecting result and the detecting result.

Embodiments of the present disclosure include a pixel driving circuit. The pixel driving circuit includes an accommodation space, a first switch, a second switch, and a third switch. The accommodation space is configured to accommodate a light-emitting element. A first terminal of the accommodation space is configured to receive a first reference voltage signal. A first terminal of the first switch is coupled with a second terminal of the accommodation space. A second terminal of the first switch is configured to output a detecting signal during a detecting operation. The second switch is configured to electrically connected the first switch with an electrical testing device to transmit the detecting signal to the electrical testing device. The third switch is coupled with the second terminal of the first switch. The third switch is configured to receive a second reference voltage signal and transmits the second reference voltage to the first switch during a reset period.

DETAILED DESCRIPTION

In the present disclosure, "connected" or "coupled" may refer to "electrically connected" or "electrically coupled." "Connected" or "coupled" may also refer to operations or actions between two or more elements. In addition, although the terms "first," "second," etc., may be used herein to describe various elements, these terms are used to distinguish one element from another. Unless the context clearly indicates, the term does not specifically refer to or imply order or sequence, nor is it configured to limit the present disclosure.

As used herein, "around," "about," "approximately," or "substantially" may mean within 20 percent, or within 10 percent, or within 5 percent of a given value or range. Numerical quantities given herein are approximate, meaning that the term "around," "about," "approximately," or "substantially" can be inferred if not expressly stated.

Unless otherwise defined, all terms (including technical and scientific terms) used in the present disclosure have the same meaning as commonly understood by the ordinary skilled person to which the concept of the present disclosure belongs. It will be further understood that terms (such as those defined in commonly used dictionaries) should be interpreted as having a meaning consistent with its meaning in the related technology and/or the context of this specification and not it should be interpreted in an idealized or overly formal sense, unless it is clearly defined as such in this article.

The terms used in the present disclosure are only used for the purpose of describing specific embodiments and are not intended to limit the embodiments. As used in the present disclosure, the singular forms "a", "one" and "the" are also intended to include plural forms and include "at least one", unless the context clearly indicates otherwise. "Or" represents "and/or". As used herein, the term "and/or" includes any or all combinations of one or more related listed items. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

Various embodiments of the present disclosure are discussed below with figures. For the sake of clarity, many practical details will be explained in the following description. It should be understood that the details should not limit the present disclosure. In other words, in some embodiments of the present disclosure, the details are not necessary. In addition, for simplification of figures, some known and commonly used structures and elements are illustrated simply in figures.

Figure 1:
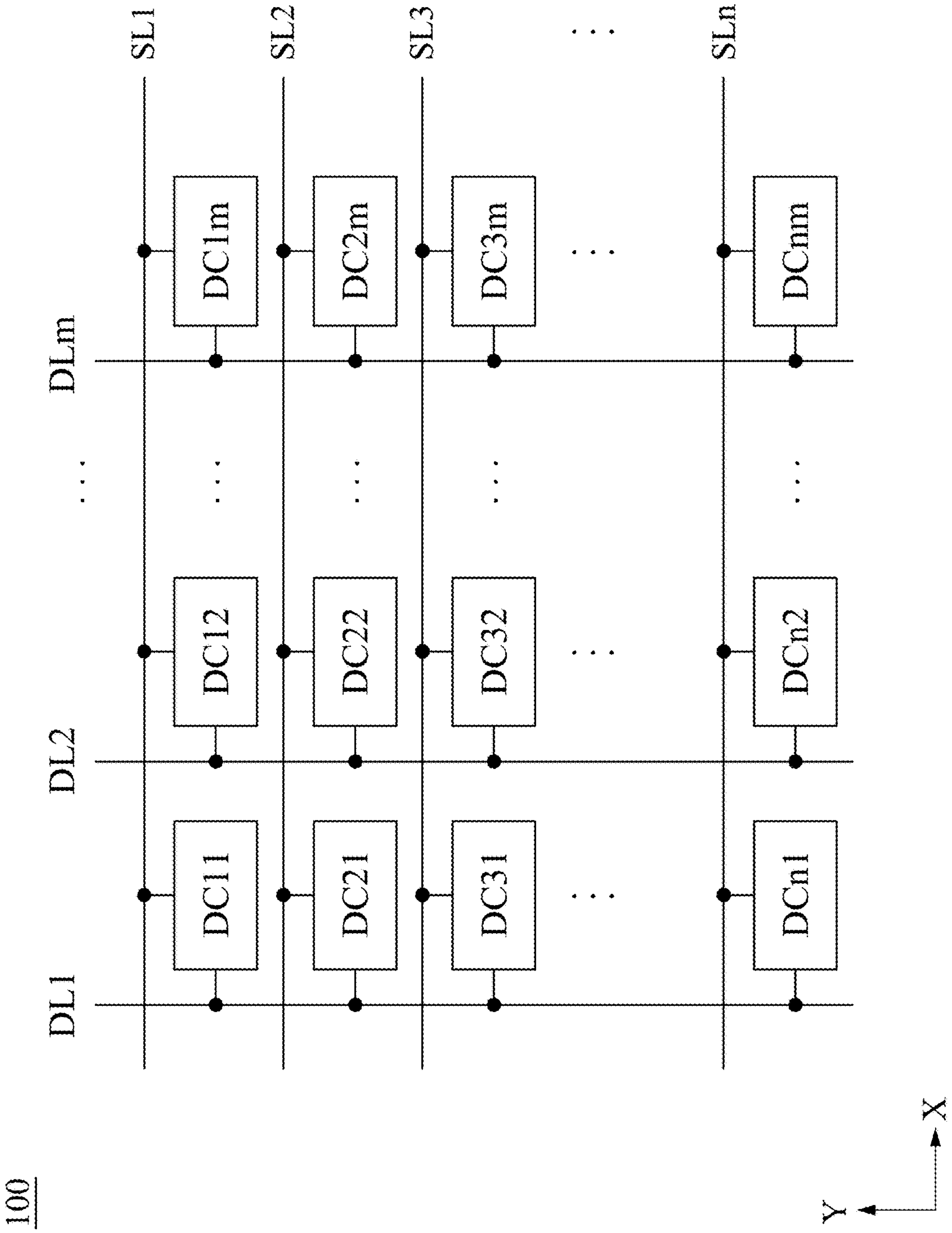
FIG. 1 illustrates a schematic diagram of a display device according to one embodiment of the present disclosure.

FIG. 1 illustrates a schematic diagram of a display device according to one embodiment of the present disclosure. Reference is made to FIG. 1. The display device 100 includes multi-stages pixel driving circuits DC11, DC12~DC1*m*, DC21, DC22-DC2*m*, DC31, DC32~DC3*m*, and DCn1, DCn2~DCnm. In this embodiment, both n and m are positive integers.

In some embodiments, the pixel driving circuits DC11-DC1*m* are the first stage pixel driving circuits, the pixel driving circuits DC21-DC2*m* are the second stage pixel driving circuits, the pixel driving circuits DC31-DC3*m* are the third stage pixel driving circuits, the pixel driving circuits DCn1-DCnm are the nth stage pixel driving circuits, and so on. Alternatively stated, the pixel driving circuit DC21 is the next stage of the pixel driving circuit DC11, the pixel driving circuit DC21 is the previous stage of the pixel driving circuit DC31, and so on.

As shown in FIG. 1, the pixel driving circuits DC11-DC1*m* are arranged in order along the first row in the X axis (i.e., the row direction, or the horizontal direction), and coupled to the scan line SL1. The pixel driving circuits DC21-DC2*m* are arranged in order along the second row in the X axis, and coupled to the scan line SL2. The pixel driving circuits DC31-DC3*m* are arranged in order along the third row in the X axis, and coupled to the scan line SL3. The pixel driving circuits DCn1-DCnm are arranged in order along the nth row in the X axis, and coupled to the scan line SLn, and so on.

As shown in FIG. 1, the pixel driving circuits DC11-DCn1 are arranged in order along the first column in the Y axis (i.e., the column direction, or the vertical direction), and coupled to the data line DL1. The pixel driving circuits DC12-DCn2 are arranged in order along the second column in the Y axis, and coupled to the data line DL2. The pixel driving circuits DC1*m*-DCnm are arranged in order along the mth column in the Y axis, and coupled to the data line DLm, and so on.

In some embodiments, for the pixel driving circuit DCnm, n indicates the Y-axis address of the pixel driving circuit DCnm in the display device 100, and m indicates the X-axis address of the pixel driving circuit DCnm in the display device 100. For example, for the pixel driving circuit DC12, the Y-axis address of is 1, and the X-axis address is 2, indicating that the pixel driving circuit DC12 is located at the first row and the second column in the display device 100.

Figure 2:
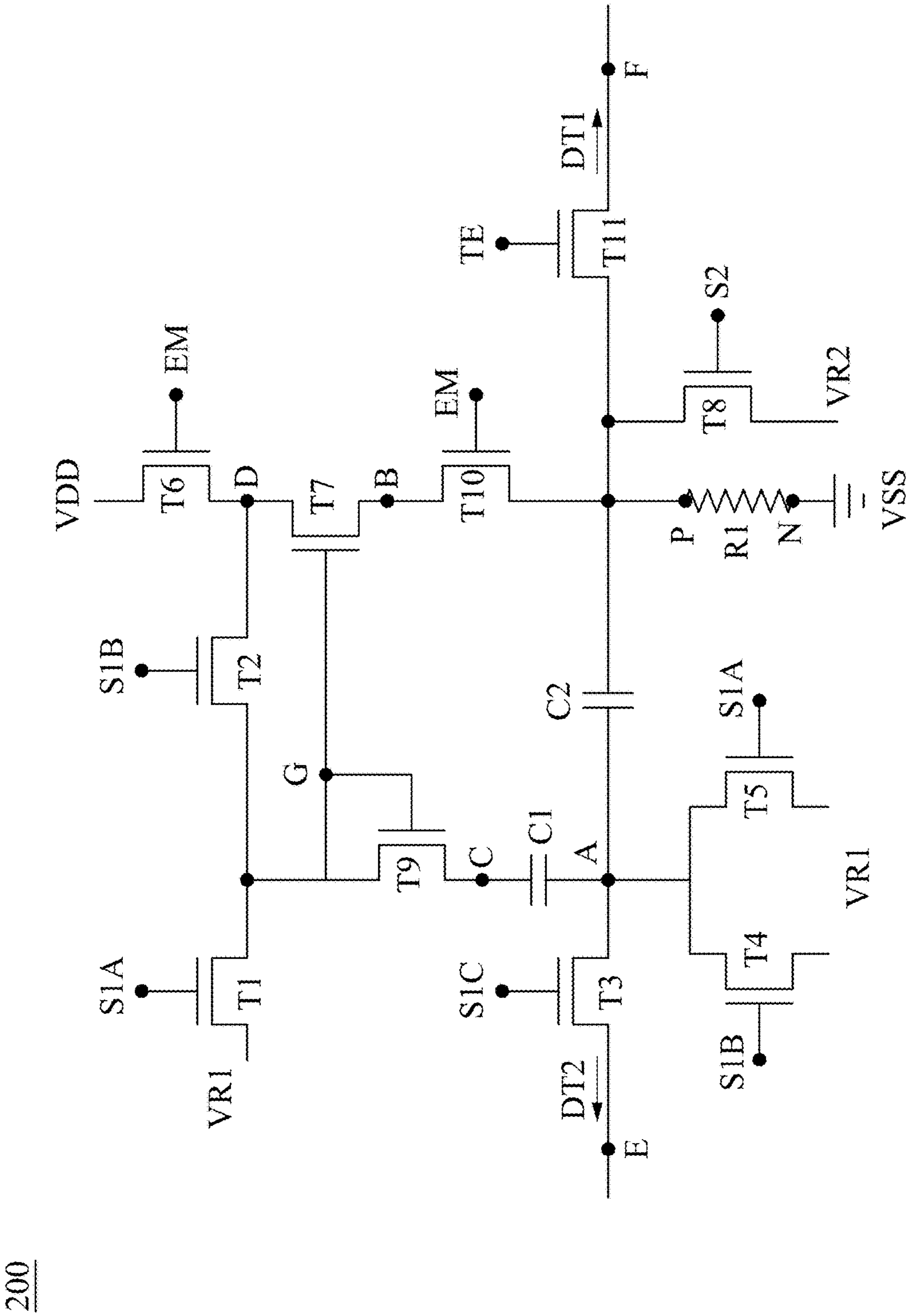
FIG. 2 illustrates a circuit diagram of a pixel driving circuit in the display device in FIG. 1 according to one embodiment of the present disclosure.

In some embodiments, the pixel driving circuits DC11-DCnm in the display device 100 execute the detecting operation according to multiple scan signals provided by the scan line SL1, SL2, and SL3-SLn, such as the scan signals S1A, S1B, S1C, and S2 shown in FIG. 2, and through multiple detecting signals received by the data lines DL1-DLm from the pixel driving circuits DC11-DCnm, such as the detecting signals DT1 and DT2 shown in FIG. 2, to determine the X-axis address and the Y-axis address of the pixel driving circuits in which the short defects occur according to the voltage levels of the detecting signals DT1 and DT2.

Figure 7:
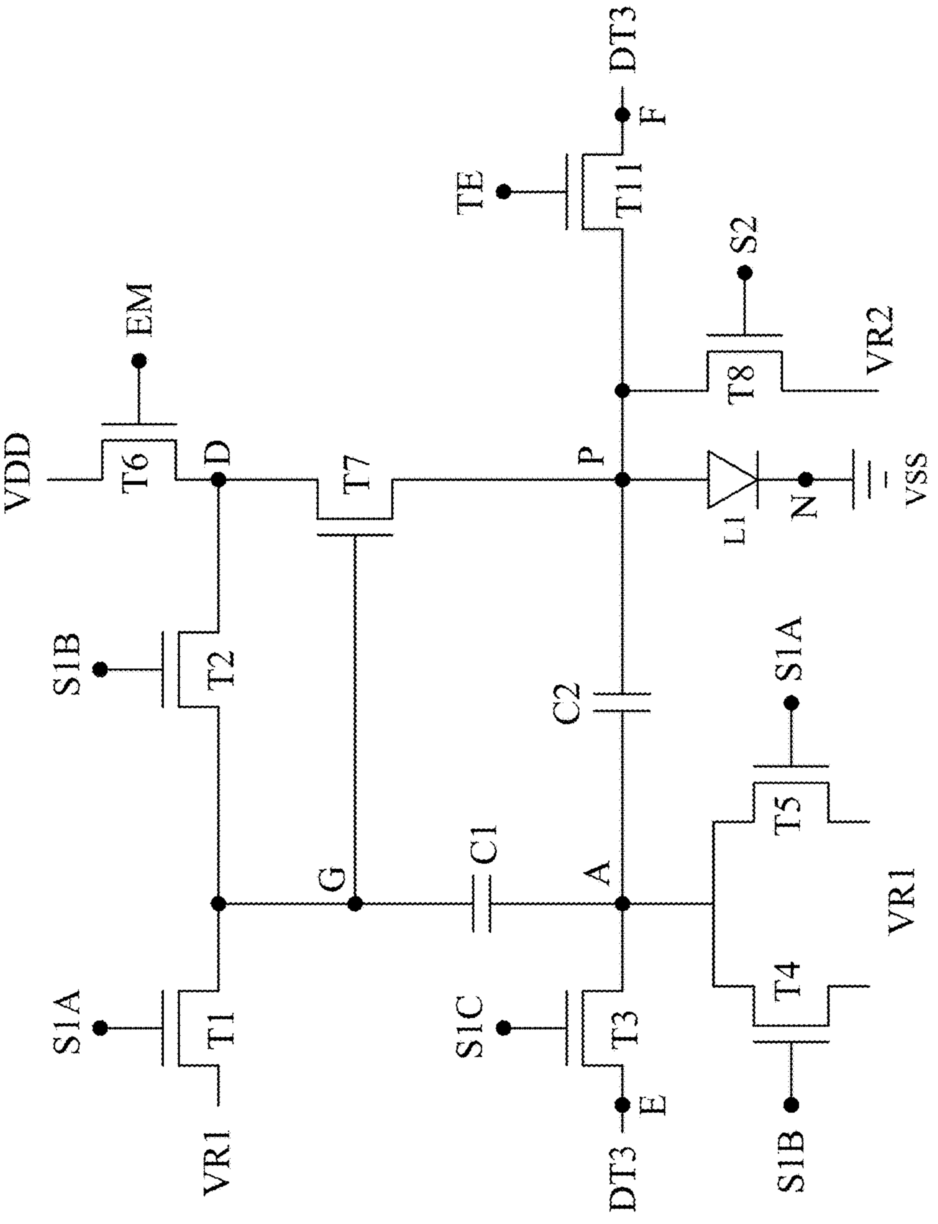
FIG. 7 illustrates a circuit diagram of a pixel driving circuit in the display device according to one embodiment of the present disclosure.

In some embodiments, the pixel driving circuits DC11-DCnm in the display device 100 executes the light emitting operation, according to the multiple scan signals provided by the scan line SL1, SL2, SL3-SLn, such as the scan signals S1A, S1B, S1C, and S2 shown in FIG. 2, and the data signals provided by the data lines DL1-DLm, such as the data signals DT3 shown in FIG. 7.

FIG. 2 illustrates a circuit diagram of a pixel driving circuit 200 in the display device 100 in FIG. 1 according to one embodiment of the present disclosure. The pixel driving circuit 200 is an embodiment of each of the pixel driving circuits DC11-DCnm shown in FIG. 1.

Reference is made to FIG. 1 and FIG. 2. In some embodiments, in the light emitting operation, the pixel driving circuit 200 is configured to execute the reset operation according to the scan signals S1A, execute the compensation operation according to the scan signal S1B, execute the data input operation according to the scan signal S1C, execute the light emitting operation according to the light emitting signal EM, and execute the regulated operation according to the scan signal S2. In the detecting operation, the display device 100 is configured to determine the X-axis address of the pixel driving circuits in which the short defects occur according to the detect enable signal TE, determine the Y-axis address of the pixel driving circuits in which the short defects occur according to the scan signal S1C.

As shown in FIG. 2, the pixel driving circuit 200 includes the switches T1-T11, the capacitors C1 and C2, and the effective resistor R1. A terminal of the switch T1 is configured to receive the reference voltage signal VR1, and another terminal of the switch T1 is coupled with the node G, and the control terminal of the switch T1 is configured to receive the scan signal S1A. A terminal of the switch T2 is coupled with the node G, another terminal of the switch T2 is coupled with the node D, and the control terminal of the switch T2 is configured to receive the scan signal S1B. A terminal of the switch T3 is coupled with the node E, and is configured to output the detecting signal DT2, another terminal of the switch T3 is coupled with the node A, and the control terminal of the switch T3 is configured to receive the scan signal S1C. A terminal of the switch T4 is configured to receive the reference voltage signal VR1, another terminal of the switch T4 is coupled with the node A, and the control terminal of the switch T4 is configured to receive the scan signal S1B. A terminal of the switch T5 is configured to receive the reference voltage signal VR1, another terminal of the switch T5 is coupled with the node A, and the control terminal of the switch T5 is configured to receive the scan signal S1A. A terminal of the switch T6 is configured to receive the reference voltage signal VDD, another terminal of the switch T6 is coupled with the node D, and the control terminal of the switch T6 is configured to receive the light emitting signal EM. A terminal of the switch T7 is coupled with the node D, another terminal of the switch T7 is coupled with the node B, and the control terminal of the switch T7 is coupled with the node G. A terminal of the switch T8 is configured to receive the reference voltage signal VR2, another terminal of the switch T8 is coupled with the node P, and the control terminal of the switch T8 is configured to receive the scan signal S2. A terminal of the switch T9 is coupled with the node C, and another terminal of the switch T9 is coupled with the node G. A terminal of the switch T10 is coupled with the node B, another terminal of the switch T10 is coupled with the node P, and the control terminal of the switch T10 is configured to receive the light emitting signal EM. A terminal of the switch T11 is coupled with the node F, and configured to output the detecting signal DT1, another terminal of the switch T11 is coupled with the node P, and the control terminal of the switch T11 is configured to receive the detect enable signal TE. A terminal of the capacitor C1 is coupled with the node C, and another terminal of the capacitor C1 is coupled with the node A. A terminal of the capacitor C2 is coupled with the node A, and another terminal of the capacitor C2 is coupled with the node P. A terminal of the effective resistor R1 is coupled with the node P, and another terminal of the resistor R1 is coupled with the node N and configured to receive the reference voltage signal VSS.

Reference is made to FIG. 1 and FIG. 2. In some embodiments, each of the node E and the node F in the pixel driving circuit 200 is coupled to one of the data lines DL1-DLm. For example, each of the node E and the node F of each of the pixel driving circuits DC11-DCn1 is coupled to the data line DL1, and each of the node E and the node F of each of the pixel driving circuits DC12-DCn2 is coupled to the data line DL2. Each of the node E and the node F of each of the pixel driving circuits DC1*m*-DCnm is coupled to the data line DLm, and so on.

Reference is made to FIG. 1 and FIG. 2. In some embodiments, the control terminal of the switch T3 in the pixel driving circuit 200 is coupled to one of the scan lines SL1-SLn. For example, the control terminal of the switch T3 of each of the pixel driving circuits DC11-DC1*m* is coupled to the scan line SL1, and the control terminal of the switch T3 of each of the pixel driving circuits DC21-DC2*m* is coupled to the scan line SL2. The control terminal of the switch T3 of each of the pixel driving circuits DCn1-DCnm is coupled to the scan line SLn, and so on.

In some embodiments, when the electrical relation between the node P and the node N is a broken circuit or an open circuit (abbreviated to "PN open circuit" below), the resistance value of the effective resistor R1 is close to infinity, and the reference voltage signal VSS cannot be provided from the node N to the node P. When the electrical relation between the node P and the node N is a closed circuit or a short circuit (abbreviated to "PN short circuit" below), the resistance value of the effective resistor R1 is close to zero, and the reference voltage signal VSS can be provided from the node N to the node P. In some embodiments, it is determined whether a short defect occurs in the pixel driving circuit 200 or not according to the electrical relation between the node P and the node N. Specifically, when the PN short circuit occurs, it is determined that a short defect occurs in the pixel driving circuit 200. When the PN open circuit occurs, it is determined that a short defect does not occur in the pixel driving circuit 200. In some embodiments, the default electrical relation is a broken circuit or an open circuit.

In different embodiments, the switches T1-T11 can be P-type metal-oxide-semiconductor field-effect transistors (PMOSs), N-type metal-oxide-semiconductor field-effect transistors (NMOSs), thin-film transistors (TFTs) or other different types of switch elements. For example, the switches T1-T11 are TFTs of NMOSs. In some embodiments, the switch T6 is referred to as the switching TFT. The switch T7 is referred to as the driving TFT.

In some embodiments, the reference voltage signal VR1 has the voltage level V1. The reference voltage signal VR2 has the voltage level V2. Each of the scan signals S1A, S1B, S1C, and S2, the light emitting EM, and the detect enable signal TE are operated between the voltage level VGH and VGL. The voltage level VGH is greater than the voltage level VGL. The voltage level V1 is greater than the voltage level V2. Each of the voltage levels V1 and V2 is between the voltage level VGH and the voltage level VGL. For example, the voltage level VGH is around 17 volts. The voltage level VGL is around-7 volts. The voltage level V1 is around 0.5 volt. The voltage level V2 is around −3 or −4 volts. In some embodiments, the reference voltage signal VSS is configured to provide the voltage level VGH which represents driving and the voltage level VGL which represents base to the pixel driving circuit 200.

In some embodiments, the voltage level VGL is the disabling voltage level of the switches T1-T11, and the voltage level VGH is the enabling voltage level of the switches T1-T11. Alternatively stated, the switches T1-T11 are turned off according to the voltage level VGL, and turned on according to the voltage level VGH.

Figure 3:
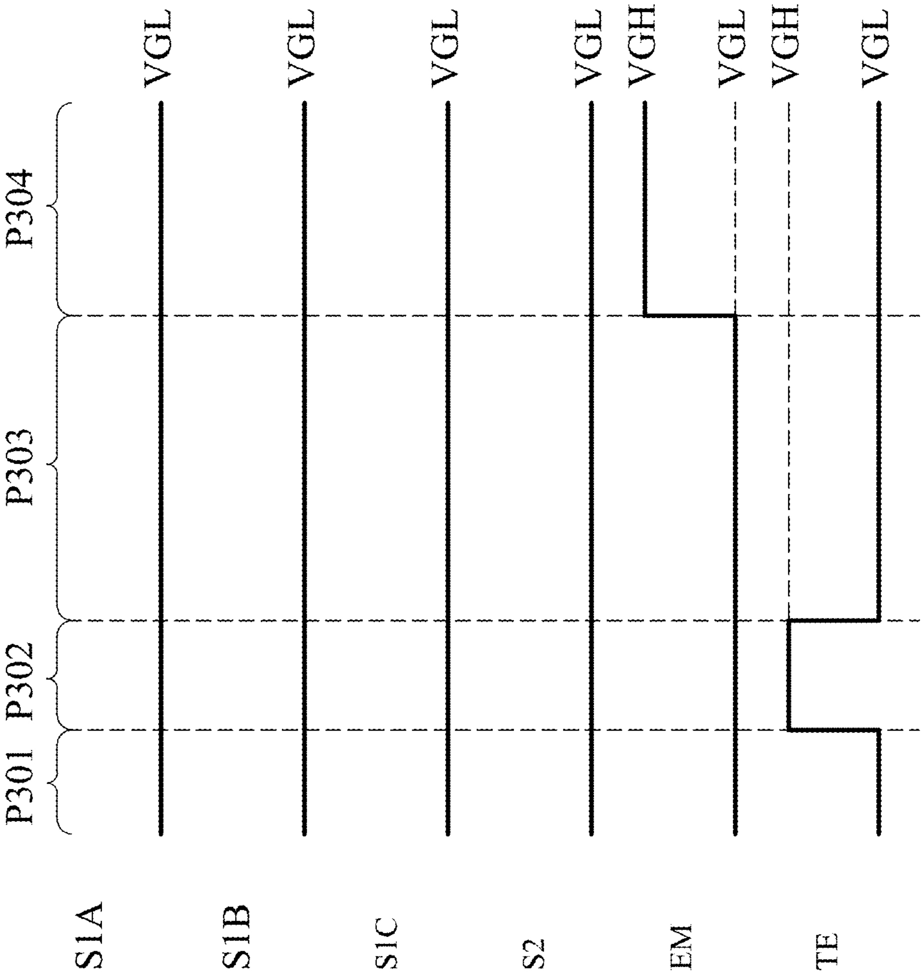
FIG. 3 illustrates a time sequence diagram of a detecting operation of the pixel driving circuit in FIG. 2 according to one embodiment of the present disclosure.

FIG. 3 illustrates a time sequence diagram 300 of a detecting operation of the pixel driving circuit 200 in FIG. 2 according to one embodiment of the present disclosure. As shown in FIG. 3, the time sequence diagram 300 includes the periods P301-P304 in order. In some embodiments, the time sequence diagram 300 corresponds to the operations for different signals as shown in FIG. 2, such as the operations for the scan signals S1A, S1B, S1C, and S2, the light emitting signal EM, and the detect enable signal TE.

During the periods P301-P303, each of the scan signals S1A, S1B, S1C, S2, and the light emitting signal EM has the voltage level VGL to cause each of the switches T1-T6, T8, and T10 to be turned off.

During the period P301, the detect enable signal TE has the voltage level VGL to cause the switch T11 to be turned off.

During the period P302, the detect enable signal TE has the voltage level VGH to cause the switch T11 to be turned on. When the PN open circuit occurs, the reference voltage signal VSS cannot be provided from the node N to the node P. Correspondingly, the voltage levels of the node P and the detecting signal DT1 are unchanged. When the PN short circuit occurs, the reference voltage signal VSS can be provided from the node N to the node P to cause the voltage levels of the node P and the detecting signal DT1 to be adjusted to the voltage level VGH or VGL.

During the period P303, the detect enable signal TE has the voltage level VGL to cause the switch T11 to be turned off.

During the period P304, the light emitting signal EM has the voltage level VGH to cause the switches T6 and T10 to be turned on. In some embodiments, the period P304 is referred to as the emission period. In some embodiments, the time sequence diagram 300 does not include the period P304.

In some embodiments, in the detecting operation, the reference voltage signal VSS is adjusted to the voltage level VGL, the operation in the time sequence diagram 300 is executed next, the voltage level VD1 of the detecting signal DT1 is measured next (not shown in Figs.), the reference voltage signal VSS is adjusted to the voltage level VGH next, the operation in the time sequence diagram 300 is executed next, the voltage level VD2 of the detecting signal DT1 is measured next (not shown in Figs.), and it is determined whether the short defects occur in the pixel driving circuit and the X axis address of the pixel driving circuit in which the short defect occurs is determined according to a voltage difference between the voltage level VD1 and the voltage level VD2.

Reference is made to FIG. 1 to FIG. 3. In some embodiments, the gate on array (gate on array, GOA) drive circuit (not shown in Figs.) executes the operation in the time sequence diagram 300 on each of the data lines DL1-DLm in the display device 100 in order, to detect whether the voltage level of the detecting signal DT1 of each of the data lines DL1-DLm is changed, and the X axis address of the pixel driving circuit in which the short defects occur is determined according to the data line which corresponds to the changed voltage level of the detecting signal DT1. For example, if the voltage level of the detecting signal DT1 of the detecting data line DL2 is changed to the voltage level VGH or VGL after executing the operation of the time sequence diagram 300, it is determined that the X axis address of the pixel driving circuit in which the short defects occur is 2, i.e., it is determined that the pixel driving circuit in which the short defects occur is at least one of the pixel driving circuits DC12-DCn2. For example, if the voltage level of the detecting signal DT1 of the detecting data line DL2 is unchanged after executing the operation of the time sequence diagram 300, it is determined that the short defects do not occur in the pixel driving circuit of the X axis address being 2, i.e., it is determined that the short defects do not occur in each of the pixel driving circuits DC12-DCn2. In some embodiments, it is detected whether the voltage level of the detecting signal DT1 of each of the data lines DL1-DLm is changed by coupling the integrator to the node F.

Figure 4:
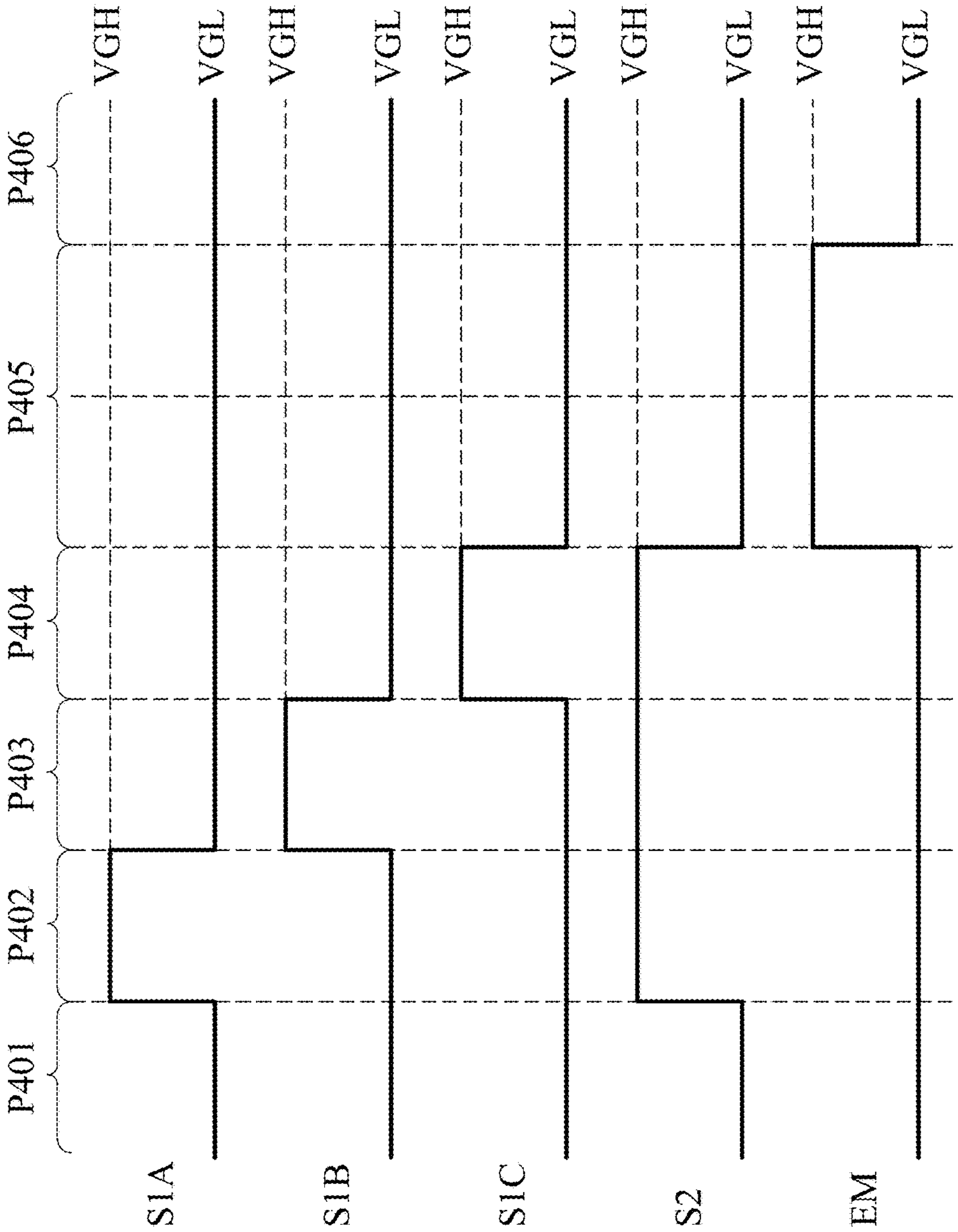
FIG. 4 illustrates a time sequence diagram of a detecting operation of the pixel driving circuit in FIG. 2 according to one embodiment of the present disclosure.

FIG. 4 illustrates a time sequence diagram 400 of a detecting operation of the pixel driving circuit 200 in FIG. 2 according to one embodiment of the present disclosure. As shown in FIG. 4, the time sequence diagram 400 includes the periods P401-P406 in order. In some embodiments, the time sequence diagram 400 corresponds to the operations for different signals as shown in FIG. 2, such as the operations for the scan signals S1A, S1B, S1C, and S2, and the light emitting signal EM.

During the periods P401-P406, each of the scan signals S1A, S1B, S1C, S2, and the light emitting signal EM is operated between the voltage levels VGH and VGL. The detect enable signal TE has the voltage level VGL (not shown in Figs.) to cause the switch T11 to keep turned off.

During the period P401, each of the scan signals S1A, S1B, S1C, and S2, and the light emitting signal EM has the voltage level VGL to cause each of the switches T1-T6, T8, and T10 to be turned off. In some embodiments, the period P401 is referred to as the off period.

During the period P402, the scan signal S1A has the voltage level VGH to cause the switches T1 and T5 to be turned on. The switches T1 and T5 provide the reference voltage signal VR1 to the nodes G and A, respectively, to reset the voltage levels of the nodes G and A to the voltage level V1. The scan signal S2 has the voltage level VGH to cause the switch T8 to be turned on. The switch T8 provides the reference voltage signal VR2 to the node P to reset the voltage level of the node P to the voltage level V2. In some embodiments, the period P402 is referred to as the reset period.

During the period P403, the scan signal S1A has the voltage level VGL to cause the switches T1 and T5 to be turned off. The scan signal S1B has the voltage level VGH to cause the switches T2 and T4 to be turned on. The switch T2 provide the voltage level V1 to the node D. The switch T4 provide the reference voltage signal VR1 to the node A to maintain the voltage level V1 of the node A. In some embodiments, the period P403 is referred to as the compensation period.

During the period P404, the scan signal S1B has the voltage level VGL to cause the switches T2 and T4 to be turned off. The scan signal S1C has the voltage level VGH to cause the switches T3 to be turned on. The switch T3 provides the voltage level of the node A to the node E. When the PN open circuit occurs, the reference voltage signal VSS cannot be provided from the node N to the node P. Correspondingly, the voltage levels of the node P, the node A, and the detecting signal DT2 are unchanged. When the PN short circuit occurs, the reference voltage signal VSS can be provided from the node N to the node P to cause the voltage level of the node P to be adjusted to the voltage level VGH or VGL. Correspondingly, the capacitor C2 adjusts the voltage level of each of the node A and the detecting signal DT2 to the voltage level V3 that is different from the voltage level V1 through the capacitive coupling (not shown in Figs.).

During the period P405, each of the scan signals S1A, S1B, S1C, and S2 has the voltage level VGL to cause each of the switches T1-T5, and T8 to be turned off. The light emitting signal EM has the voltage level VGH to cause each of the switches T1-T5, and T8 to be turned on. In some embodiments, the period P405 is referred to as the emission period. In some embodiments, the time sequence diagram 400 does not include the period P405.

During the period P406, the light emitting signal EM has the voltage level VGL to cause each of the switches T6 and T10 to be turned off. In some embodiments, the period P406 is referred to as the stable period.

In some embodiments, in the detecting operation, the reference voltage signal VSS is adjusted to the voltage level VGL, the operation in the time sequence diagram 400 is executed next, the voltage level VD3 of the detecting signal DT2 is measured next (not shown in Figs.), the reference voltage signal VSS is adjusted to the voltage level VGH next, the operation in the time sequence diagram 400 is executed next, the voltage level VD4 of the detecting signal DT2 is measured next (not shown in Figs.), and it is determined whether the short defects occur in the pixel driving circuit and the Y axis address of the pixel driving circuit in which the short defect occurs is determined according to a voltage difference between the voltage level VD3 and the voltage level VD4.

Reference is made to FIG. 1 to FIG. 4. In some embodiments, the display device 100 executes the operation in the time sequence diagram 300 and then executes the operation in the time sequence diagram 400, to position the pixel driving circuit in which the short defects occur. Alternatively stated, the display device 100 executes the operation in the time sequence diagram 300 in order to determine the X axis address of the pixel driving circuit in which the short defects occur, then executes the operation in the time sequence diagram 400 to determine the Y axis address of the pixel driving circuit in which the short defects occur, and the pixel driving circuit which the short defects occur by the X axis address and the Y axis address.

Specifically, the display device 100 executes the operation of the time sequence diagram 300 on each of the data lines DL1-DLm in order through GOA, to determine the X axis address of the pixel driving circuit in which the short defects occur in order, and then executes the operation in the time sequence diagram 400 on each of the scan lines SL1-SLn in order through GOA to determine the Y axis address of the pixel driving circuit in which the short defects occur.

For example, the display device 100 executes the operation in the time sequence diagram 300 on each of the data lines DL1-DLm in order, to determine that the pixel driving circuit in which the short defects occur is at least one of the pixel driving circuits DC12-DCn2 which correspond to the data line DL2, and then executes the operation during the periods P401-P406 on each of the scan lines SL1-SLn in order. If the voltage level of the data line DL2 is changed when the scan line SL2 executes the operation during the periods P401-P406, it is determined that the Y axis address of the pixel driving circuit in which the short defects occur is 2, i.e., it is determined that the pixel driving circuit in which the short defects occur is the pixel driving circuits DC22. If the voltage level of the data line DL2 is unchanged when the scan line SL2 executes the operation during the periods P401-P406, it is determined that the short defects do not occur in the pixel driving circuit DC22.

Figure 5:
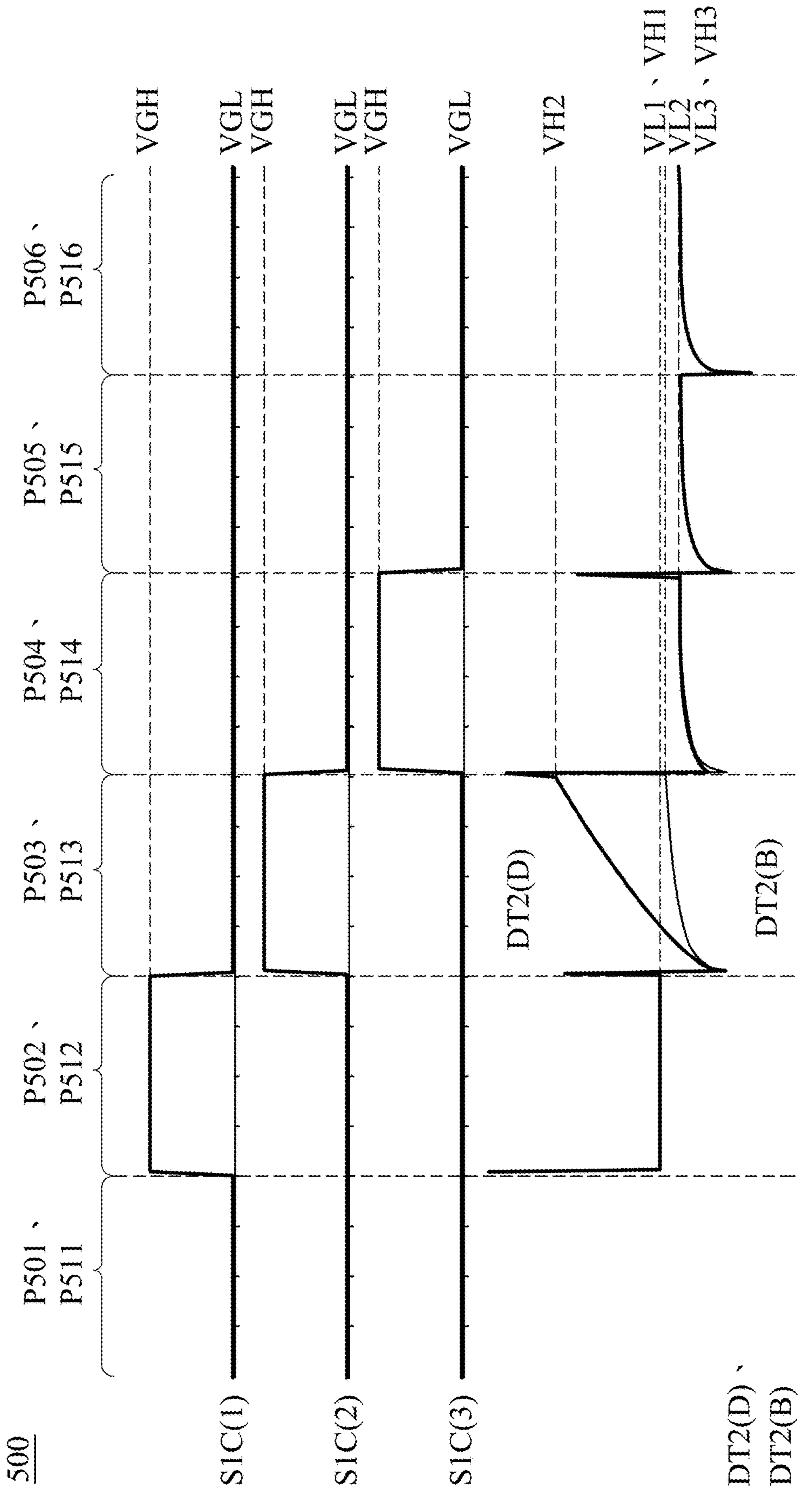
FIG. 5 illustrates a time sequence diagram of a detecting operation of the display device in FIG. 1 according to one embodiment of the present disclosure.

FIG. 5 illustrates a time sequence diagram of a detecting operation of the display device in FIG. 1 according to one embodiment of the present disclosure. As shown in FIG. 5, the time sequence diagram 500 includes the periods P501-P506 and P511-P516 in order. In some embodiments, the time sequence diagram 500 corresponds to the operations for different signals as shown in FIG. 2. For example, the operations for the scan signals S1C(1)-S1C(3) correspond to the operation for the scan signal S1C, the operation for the detecting signal DT2(B) corresponds to the operation for the detecting signal DT2 during the periods P501-P506, and the operation for the detecting signal DT2(D) corresponds to the operation for the detecting signal DT2 during the periods P511-P516.

Reference is made to FIG. 1, FIG. 2, FIG. 4, and FIG. 5. In some embodiments, the time sequence diagram 500 corresponds to a superposition of a part of time sequence plots occurring where the display device 100 executes the operation in the time sequence diagram 400 on each of the pixel driving circuit DC11-DCnm in order when the reference voltage signal VSS has the voltage level VGL and VGH. Specifically, the detecting signal DT2(B) indicates the detecting signal DT2 generated because the display device 100 executes the operation in the time sequence diagram 400 on each of the pixel driving circuits DC11-DCnm in order when the reference voltage signal VSS has the voltage level VGL. The detecting signal DT2(D) indicates the detecting signal DT2 generated because the display device 100 executes the operation in the time sequence diagram 400 on each of the pixel driving circuits DC11-DCnm in order when the reference voltage signal VSS has the voltage level VGH.

Reference is made to FIG. 1, FIG. 2, and FIG. 5. The scan signal S1C(1)-S1C(3) correspond the scan signals provided by three of the scan lines SL1-SLn, such as the scan lines SL1-SL3, respectively. The scan signals S1C(1)-S1C(3) correspond to the scan signals S1C of three of the pixel driving circuits having the same Y axis address, respectively. For example, the scan signal S1C (1) corresponds to the scan signal S1C of the pixel driving circuit DC11, the scan signal S1C (2) corresponds to the scan signal S1C of the pixel driving circuit DC21, and the scan signal S1C (3) corresponds to the scan signal S1C of the pixel driving circuit DC31. The display device 100 receive the detecting signal DT2(B) and DT2(D) through one of the data lines DL1-DLm, such as the data line DL1.

During the periods P501-P506, the reference voltage signal VSS has the voltage level VGL (not shown in Figs.).

During the periods P511-P516, the reference voltage signal VSS has the voltage level VGL (not shown in Figs.). The detecting signal DT2(B) corresponds to the detecting signal DT2 during the periods P501-P506, and the detecting signal DT2(D) corresponds to the detecting signal DT2 during the periods P511-P516. In some embodiments, the display device 100 adjusts the voltage level of the reference voltage signal VSS to the voltage level VGL, executes the operation during the periods P501-P506 next, adjusts the voltage level of the reference voltage signal VSS to the voltage level VGH next, and then executes the operation during the periods P511-P516. In another embodiments, the display device 100 adjusts the voltage level of the reference voltage signal VSS to the voltage level VGH, executes the operation during the periods P511-P516 next, adjusts the voltage level of the reference voltage signal VSS to the voltage level VGL next, and then executes the operation during the periods P501-P506.

During the periods P501 and P511, each of the scan signals S1C(1)-S1C(3) has the voltage level VGL. The switch T3 of each of the pixel driving circuits DC11-DC31 is turned off.

During the periods P502 and P512, the scan signal S1C (1) has the voltage level VGH to cause the switch T3 in the pixel driving circuit DC11 to be turned on. Correspondingly, the detecting signal DT2(B) has the voltage level VL1 during the period P502, and the detecting signal DT2(D) has the voltage level VH1 that is roughly the same as the voltage level VL1 during the period P512.

During the periods P503 and P513, the scan signal S1C (1) has the voltage level VGL to cause the switch T3 in the pixel driving circuit DC11 to be turned off. The scan signal S1C (2) has the voltage level VGH to cause the switch T3 in the pixel driving circuit DC21 to be turned on. Correspondingly, the detecting signal DT2(B) has the voltage level VL2 during the period P503, and the detecting signal DT2(D) has the voltage level VH2 that is different from the voltage level VL2 during the period P513.

During the periods P504 and P514, the scan signal S1C (2) has the voltage level VGL to cause the switch T3 in the pixel driving circuit DC21 to be turned off. The scan signal S1C (3) has the voltage level VGH to cause the switch T3 in the pixel driving circuit DC31 to be turned on. Correspondingly, the detecting signal DT2(B) has the voltage level VL3 during the period P504, and the detecting signal DT2(D) has the voltage level VH3 that is roughly the same as the voltage level VL3 during the period P514.

During the periods P505 and P515, the scan signal S1C (3) has the voltage level VGL to cause the switch T3 in the pixel driving circuit DC31 to be turned off. The scan signal located at the next stage pixel driving circuit of the pixel driving circuit DC31 has the voltage level VGH. For example, the scan signal S1C (4) (not shown in Figs.) of the pixel driving circuit DC41 has the voltage level VGH to cause the switch T3 of the pixel driving circuit DC41 to be turned on. Correspondingly, the detecting signal DT2(B) has the voltage level VL4 (not shown in Figs.) during the period P505, and the detecting signal DT2(D) has the voltage level VL4 that is roughly the same as the voltage level VH4 (not shown in Figs.) during the period P515.

During the periods P506 and P516, the scan signal S1C (4) has the voltage level VGL to cause the switch T3 in the pixel driving circuit DC41 to be turned off. The scan signal located at the next stage pixel driving circuit of the pixel driving circuit DC41 has the voltage level VGH. For example, the scan signal S1C (5) (not shown in Figs.) of the pixel driving circuit DC51 has the voltage level VGH to cause the switch T3 of the pixel driving circuit DC51 to be turned on. Correspondingly, the detecting signal DT2(B) has the voltage level VL5 (not shown in Figs.) during the period P506, and the detecting signal DT2(D) has the voltage level VL5 that is roughly the same as the voltage level VH5 (not shown in Figs.) during the period P516.

In some embodiments, when the scan signals S1C in the same pixel driving circuit have the voltage level VGH in the time sequence diagram, it is compared whether the voltage level of the detecting signal DT2(B) and the voltage level of the detecting signal DT2(D) are roughly the same, to determine whether the short defects occur in the corresponding pixel driving circuit. Specifically, the scan signal S1C (1) has the voltage level VGH during the periods P502 and P512, and it is compared that the voltage level VL1 of the detecting signal DT2(B) during the period P502 and the voltage level VH1 of the detecting signal DT2(D) during the period P512 are roughly the same and it is determined that the short defects does not occur in the pixel driving circuit DC11. The scan signal S1C (2) has the voltage level VGH during the periods P503 and P513, and it is compared that the voltage level VL2 of the detecting signal DT2(B) during the period P503 is different from the voltage level VH2 of the detecting signal DT2(D) during the period P513 and it is determined that the short defects occurs in the pixel driving circuit DC21. Similarly, it is determined that the short defects does not occur in the pixel driving circuits DC31, DC41, and DC51 according to the time sequence diagram 500.

Reference is made to FIG. 3 to FIG. 5. In some embodiments, each of the periods P302, P402-P404, P505-P506 has the same time length. The time length of the period P405 is roughly double the time length of the period P402.

Figure 6:
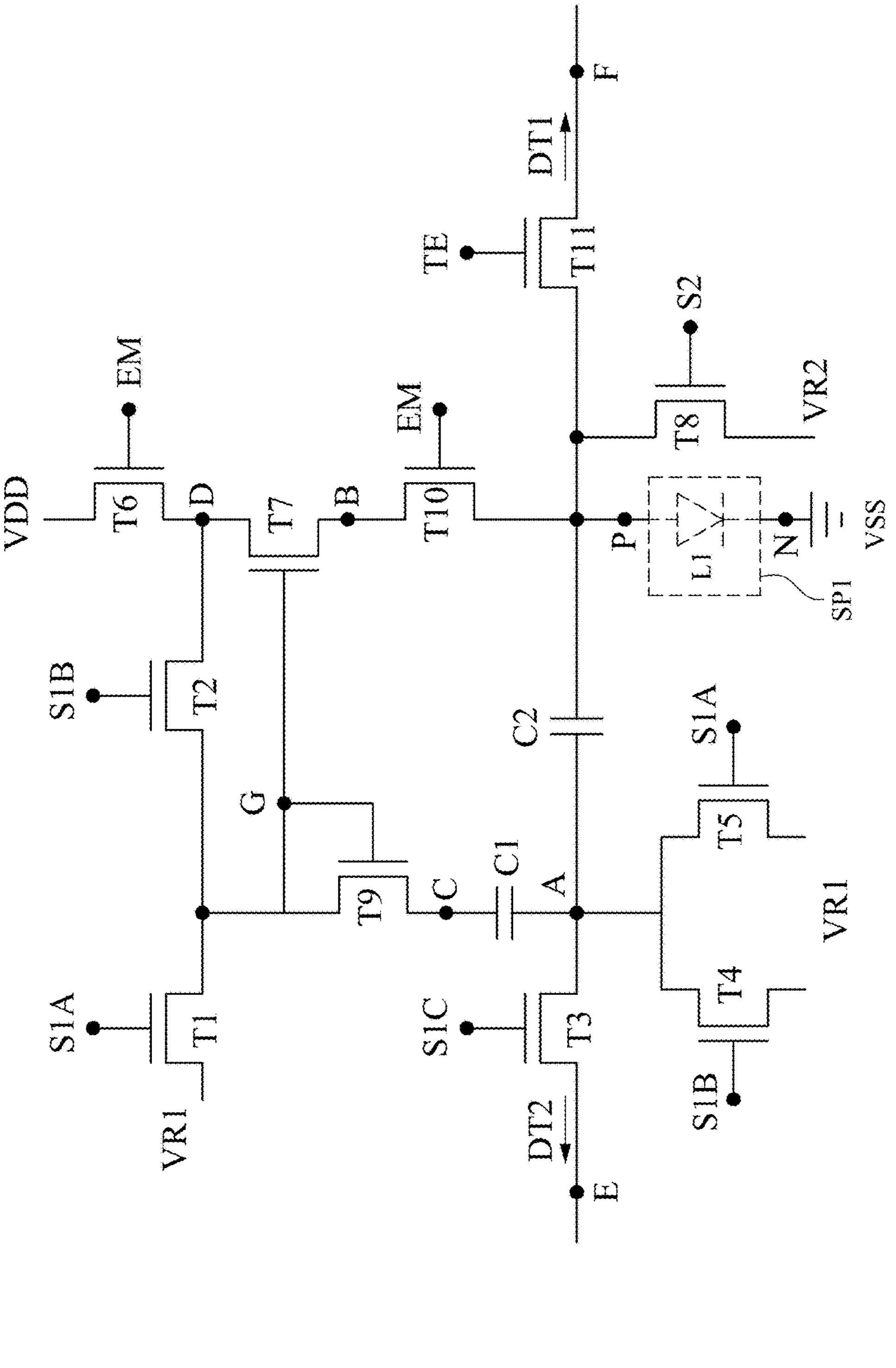
FIG. 6 illustrates a time sequence diagram of a detecting operation of the display device in FIG. 1 according to one embodiment of the present disclosure.

FIG. 6 illustrates a time sequence diagram of a detecting operation of the display device in FIG. 1 according to one embodiment of the present disclosure. The pixel driving circuit 600 is an embodiment of the pixel driving circuits DC11-DCnm in the display device 100. The pixel driving circuit 600 is a variation example of the pixel driving circuit 200 shown in FIG. 2.

Reference is made to FIG. 2 and FIG. 6. The pixel driving circuit 600 has the same components as the pixel driving circuit 200, including the switches T1-T11 and the capacitors C1 and C2, and the connection relation between components similar to the pixel driving circuit 200. Thus, the repetitive description is omitted. The difference between FIG. 6 and FIG. 2 is that the pixel driving circuit 600 includes the accommodation space SP1 instead of the effective resistor R1.

As shown in FIG. 6, a terminal of the accommodation space SP1 is coupled with the node P, and another terminal of the accommodation space is coupled with the node N and configured to receive the reference voltage signal VSS. Reference is made to FIG. 3 to FIG. 6. In some embodiments, the accommodation space SP1 is configured to accommodate the light emitting element L1 after executing the detecting operations in the time sequence diagram 300, 400, and 500. For example, after executing the detecting operations in the time sequence diagram 300, 400, and 500, when determining that the electrical relation between the node P and the node N in the pixel driving circuit 600 is a broken circuit or a open circuit, the light emitting element L1 is coupled between the node P and the node N. In some embodiments, the light emitting element L1 is a micro light-emitting diode (micro LED, μLED).

In some approaches, in the array test (AT) of μLED display panel, if a short defect occurs in a μLED, the AT can only detect the X address thereof and cannot detect the Y address thereof, which leads to be unable to find the μLED in which the short defect occurs.

In comparison with the approaches mentioned above, in some embodiments of the present disclosure, the Y axis address of the pixel driving circuit having a short defect is found by the switch T3 and the capacitor C2. In this way, the pixel driving circuit having a short defect can be found, and the usage of other transistors and signal routing can be saved at the same time.

FIG. 7 illustrates a circuit diagram of a pixel driving circuit 700 in the display device 100 according to one embodiment of the present disclosure. The pixel driving circuit 700 is an embodiment of each of the pixel driving circuits DC11-DCnm shown in FIG. 1. The pixel driving circuit 700 is a variation example of the pixel driving circuit 200 shown in FIG. 2.

Reference is made to FIG. 7 and FIG. 2. The pixel driving circuit 700 has the same components as the pixel driving circuit 200, including the switches T1-T8 and T11 and the capacitors C1 and C2, and the connection relation between components similar to the pixel driving circuit 200. Thus, the repetitive description is omitted. The difference between FIG. 7 and FIG. 2 is that the pixel driving circuit 700 does not include the switches T9 and T10, and includes the light emitting element L1 instead of the effective resistor R1. A terminal of the switch T3 is configured to receive the data signal DT3 instead of outputting the detecting signal DT2. A terminal of the switch T11 is configured to receive the data signal DT3 instead of outputting the detecting signal DT2. A terminal of the switch T11 is configured to receive the data signal DT3 instead of outputting the detecting signal DT1. Correspondingly, a terminal of the capacitor C1 is coupled with the node G instead of the node C. Another terminal of the switch T7 is coupled with the node P instead of the node B. The first terminal of the light emitting element L1 is coupled with the node P and the second terminal of the light emitting element L1 is coupled with the node N and configured to receive the reference voltage signal VSS. In some embodiments, the switches T1-T8 and T11 are N-type oxide thin-film transistors (oxide TFTs).

Figure 8:
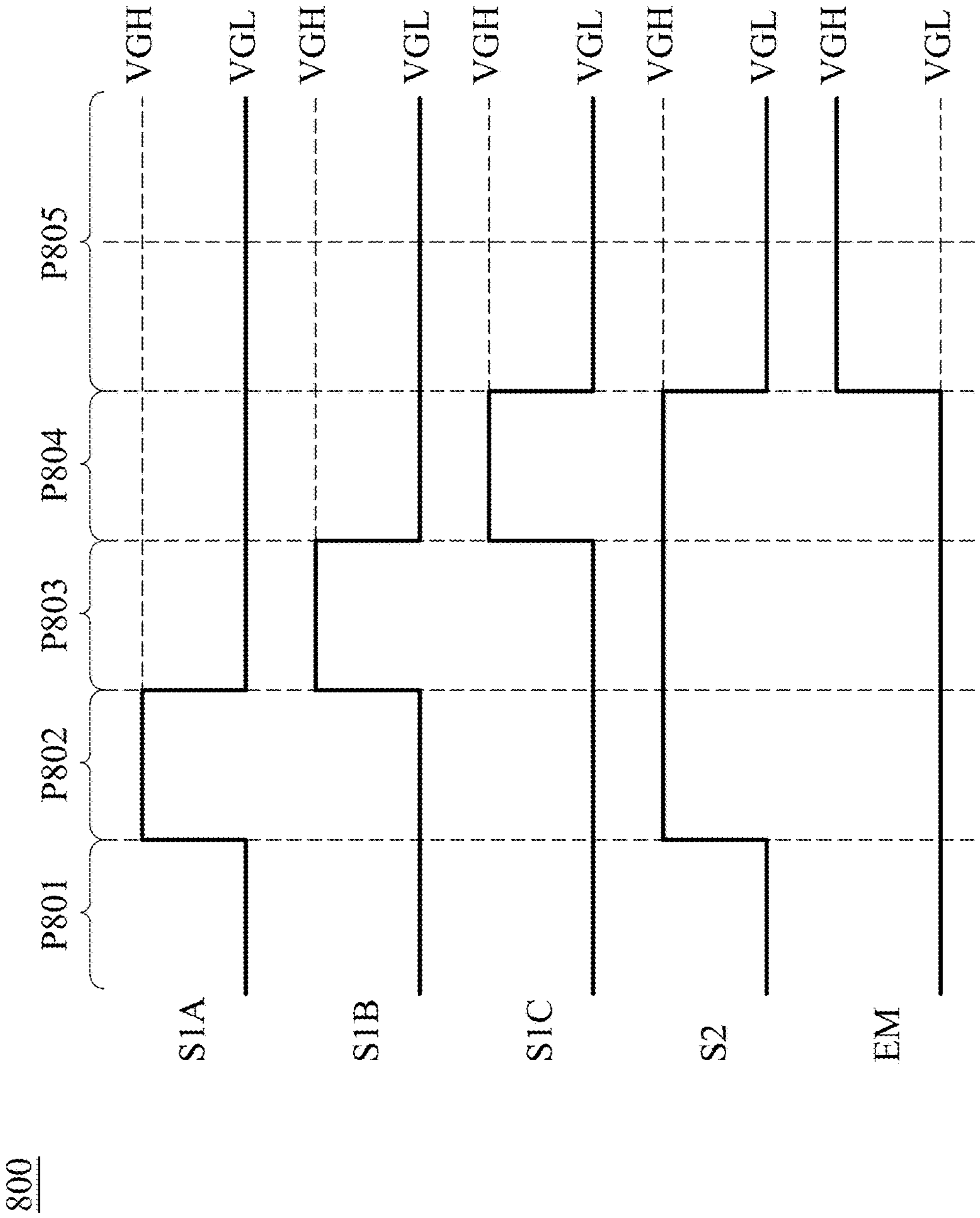
FIG. 8 illustrates a time sequence diagram of a light emitting operation of the pixel driving circuit in FIG. 7 according to one embodiment of the present disclosure.

FIG. 8 illustrates a time sequence diagram 800 of a light emitting operation of the pixel driving circuit 700 in FIG. 7 according to one embodiment of the present disclosure. As shown in FIG. 8, the time sequence diagram 800 includes the periods P801-P805 in order. In some embodiments, the time sequence diagram 800 corresponds to the operations for different signals as shown in FIG. 7, such as the operations for the scan signals S1A, S1B, S1C, and S2, and the light emitting signal EM.

During the periods P801-P805, each of the scan signals S1A, S1B, S1C, and S2, and the light emitting signal EM is operated between the voltage levels VGH and VGL. The detect enable signal TE has the voltage level VGL to cause the switch T11 to keep turned off. The data signal DT3 has the voltage level VDT. In some embodiments, the time length of the period P802 is the same as the time length of each of the periods P803 and P804.

During the period P801, each of the scan signals S1A, S1B, S1C, and S2, and the light emitting signal EM has the voltage level VGL to cause each of the switches T1-T6, T8, and T10 to be turned off. In some embodiments, the period P801 is referred to as the off period.

During the period P802, the scan signal S1A has the voltage level VGH to cause the switches T1 and T5 to be turned on. The switches T1 and T5 provide the reference voltage signal VR1 to the nodes G and A, respectively, to reset the voltage levels of the nodes G and A to the voltage level V1 to cause the switch T7 to be turned on. The scan signal S2 has the voltage level VGH to cause the switch T8 to be turned on. The switch T8 provide the reference voltage signal VR2 to the nodes P and D to reset the voltage levels of the nodes P and D to the voltage level V2. In some embodiments, the period P802 is referred to as the reset period.

During the period P803, the scan signal S1A has the voltage level VGL to cause the switches T1 and T5 to be turned off. The scan signal S1B has the voltage level VGH to cause the switches T2 and T4 to be turned on. The switch T7 is diode connected to cause the voltage levels of the nodes D and G to be adjusted to the voltage level (V2+$V_{TH\_7}$), in which the threshold voltage level $V_{TH\_7}$ is the threshold voltage level of the switch T7. When the absolute value of a voltage difference between the node G and the node S is close to the threshold voltage level $V_{TH\_7}$, the switch T7 is approximately turned off. The switch T7 senses and saves the threshold voltage level $V_{TH\_7}$ at the node. The switch T4 provides the reference voltage signal VR1 to the node A, to maintain the voltage level V1 of the node A. In some embodiments, the period P803 is referred to as the threshold voltage sensing ($V_{TH}$ sensing) period. In view of above, the pixel driving circuit 700 compensates the variation of the threshold voltage of the switch T7 by the switch T2.

During the period P804, the scan signal S1B has the voltage level VGL to cause the switches T2 and T4 to be turned off. The scan signal S1C has the voltage level VGH to cause the switches T3 to be turned on. The switch T3 provides the voltage level VDT of the data signal DT3 to the node A.

Correspondingly, the capacitor C1 adjusts the voltage level of the node G to the voltage level (V2+$V_{TH\_7}$+VDT-V1) through the capacitive coupling. In some embodiments, the period P804 is referred to as the data input period.

During the period P805, each of the scan signals S1A, S1B, S1C, and S2 has the voltage level VGL to cause each of the switches T1-T5, and T8 to be turned off. The light emitting signal EM has the voltage level VGH to cause each of the switch T6 to be turned on. The light emitting element L1 begins to emit light. Correspondingly, the voltage level of the node P is adjusted to the voltage level (OVSS+$V_{L1}$). The capacitors C1 and C2 adjust the voltage level of the node G to the voltage level ($V_{TH\_7}$+VDT-V1+OVSS+$V_{L1}$) through the capacitive coupling, in which the voltage level OVSS is the voltage level of the reference voltage signal VSS, and the voltage level $V_{L1}$ is the voltage across the light emitting element L1, such as the absolute value of the voltage difference between the nodes P and N. The voltage level OVSS is between the voltage levels V1 and V2. The voltage level OVSS is around 0 volt. In some embodiments, the period P805 is referred to as the light emitting period.

Also during the period P805, the switch T6 is operated in the linear region, and the switch T7 is operated in the saturation region. When the switch T7 is operated in the saturation region, the drive current IL (not shown in Figs.) that drives the light emitting element L1 is easily influenced by the variation of the threshold voltage of the switch T7. The current value I of the drive current IL is calculated by the following equation (1):

$$I = 0.5k(V_{GS} - V_{TH})^2 = 0.5k[(V_{TH\_7} + VDT - V1 + OVSS + V_{L1}) - (OVSS + V_{L1}) - (V_{TH\_7})]^2 = 0.5k(VDT - V1)^2. \quad (1)$$

The conductive parameter k is the conductive parameter of the switch T7. The voltage value Vas is the voltage between the gate terminal and the source terminal of the switch T7, such as the voltage difference between the nodes G and P. The voltage value $V_{TH}$ is the threshold voltage of the switch T7, such as the threshold voltage level $V_{TH\_7}$. For example, the drive current I of the light emitting element L1 is the current that flows from the first terminal of the switch configured to receive the reference voltage signal VDD, through the switches T6, T7, and the light emitting element L1, to the node N configured to receive the reference signal VSS. In equation (1), the voltage level OVSS, the threshold voltage level $V_{TH\_7}$., and the voltage level $V_{L1}$ are eliminated. In view of the above, the current value I of the drive current is not influenced by the voltage level of the reference voltage signal VSS and the threshold voltage of the switch T7.

Figure 9:
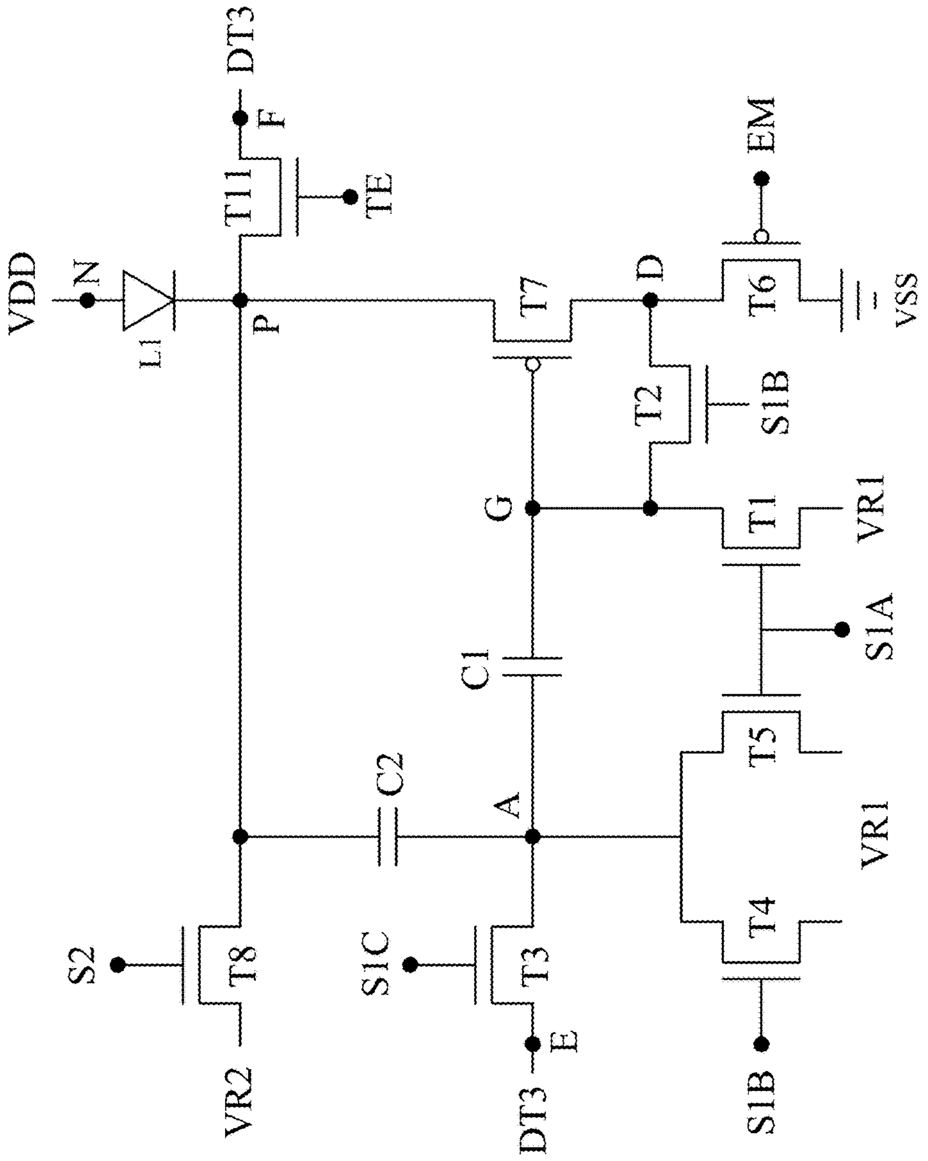
FIG. 9 illustrates a circuit diagram of a pixel driving circuit in the display device in FIG. 1 according to one embodiment of the present disclosure.

FIG. 9 illustrates a circuit diagram of a pixel driving circuit 900 in the display device 100 in FIG. 1 according to one embodiment of the present disclosure. The pixel driving circuit 900 is an embodiment of each of the pixel driving circuits DC11-DCnm shown in FIG. 1. The pixel driving circuit 900 is a variation example of the pixel driving circuit 700 shown in FIG. 7.

Reference is made to FIG. 9 and FIG. 7. The pixel driving circuit 900 has the same components as the pixel driving circuit 700, including the switches T1-T8 and T11 and the capacitors C1 and C2, and the connection relation between components similar to the pixel driving circuit 700. Thus, the repetitive description is omitted. The difference between FIG. 9 and FIG. 7 is that a terminal of the switch T6 in the pixel driving circuit 900 is configured to receive the reference voltage signal VSS instead of the reference voltage signal VDD. The first terminal of the light emitting element L1 is coupled with the node N instead of the node P and configured to receive the reference voltage signal VDD, and the second terminal of the light emitting element L1 is coupled with the node P instead of the node N. In some embodiments, each of the switches T1-T5, T8, and T11 and the switches T6 and T7 are different type of transistors. For example, each of the switches T1-T5, T8, and T11 is a N-type oxide TFT, and the switches T6 and T7 are P-type low temperature poly-silicon thin film transistor (LTPS TFT). In some embodiments, each of the switches T1-T8 and T11 is a P-type TFT.

Figure 10B:
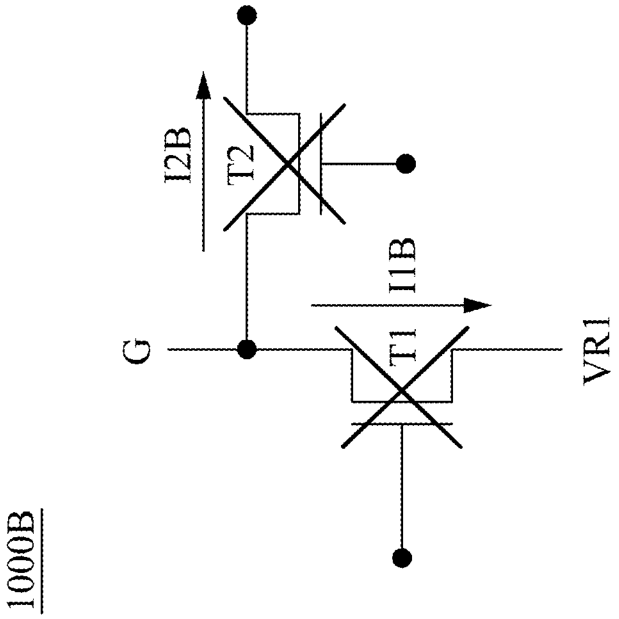
FIG. 10A and FIG. 10B illustrate circuit diagrams of local circuits of the pixel driving circuit in FIG. 9 according to one embodiment of the present disclosure.
Figure 10A:
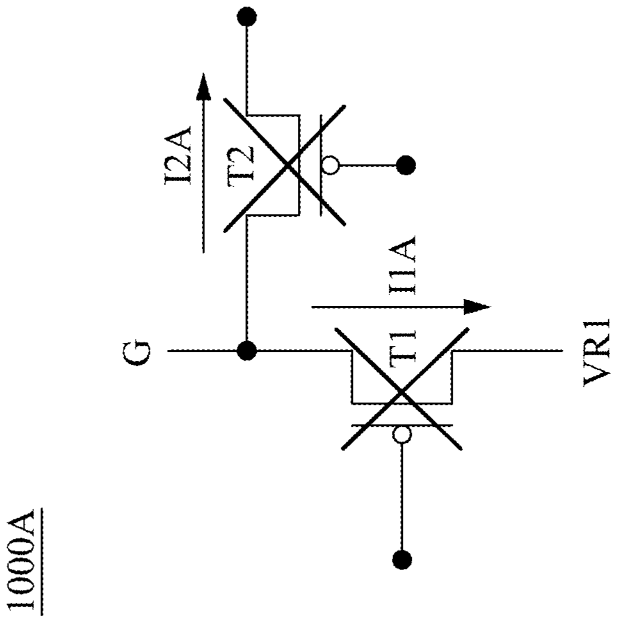

FIG. 10A and FIG. 10B illustrate circuit diagrams of local circuits 1000A and 1000B of the pixel driving circuit 900 in FIG. 9 according to one embodiment of the present disclosure, respectively. Reference is made to FIG. 10A, FIG. 10B, and FIG. 9. The local circuits 1000A and 1000B have the same components as the pixel driving circuit 900. Both includes the switches T1 and T2, and the same connection relation between components as the pixel driving circuit 900. Thus, the repetitive description is omitted.

As shown in FIG. 10A and FIG. 10B, the switches T1 and T2 in the local circuit 1000A are P-type LTPS TFTs. The switches T1 and T2 in the local circuit 1000B are N-type LTPS TFTs. When the switches T1 and T2 are turned off, for example, during the period P804 and P805, in the local circuit 1000A, the leakage currents which flow through the switches T1 and T2 are the leakage currents 11A and I2A, respectively. In the local circuit 1000B, the leakage currents which flow through the switches T1 and T2 are the leakage currents 11B and 12B, respectively. The current values of the leakage currents 11A and 12A are greater than the current values of the leakage currents 11B and 12B. In some embodiments, the magnitudes of the leakage currents that flow through the switches T1 and T2 from the node G is associated with the image flicker. For example, the greater the leakage currents that flow through the switches T1 and T2 are, the more significantly the display screen flashes.

Reference is made to FIG. 3 to FIG. 9. In some embodiments, the pixel driving circuit 600 can execute the light emitting operation in the time sequence diagram 800 after the light emitting element L1 is coupled between the node P and the node N. Each of the pixel driving circuit 700 and 900 can execute the detecting operation in the time sequence diagrams 300 and 400.

Figure 11:
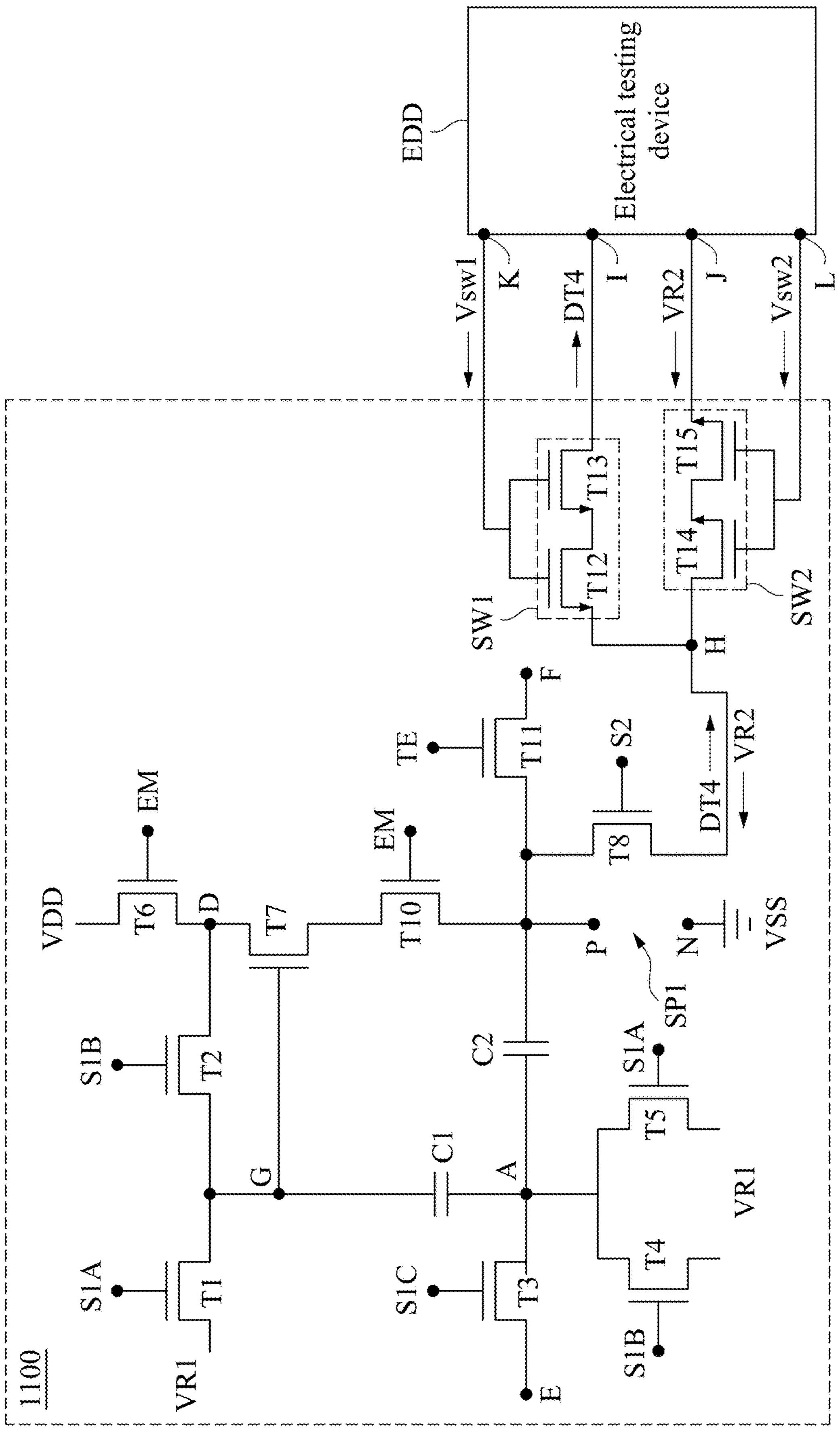
FIG. 11 illustrates a circuit diagram of a pixel driving circuit in the display device in FIG. 1 according to one embodiment of the present disclosure.

Reference is made to FIG. 11. FIG. 11 illustrates a circuit diagram of a pixel driving circuit 1100 in the display device 100 in FIG. 1 according to one embodiment of the present disclosure. The pixel driving circuit 1100 is an embodiment of each of the pixel driving circuit DC11-DCnm shown in FIG. 1.

As shown in FIG. 11, the pixel driving circuit 1100 includes the switches T1-T11, the capacitors C1-C2, the accommodation space SP1 between the node P and the node N, and the switches SW1-SW2. The switches T1-T7 and T9-T11 and the switches SW1-SW2. The configuration of the switches T1-T7 and T9-T11 and the capacitors C1-C2 is the same as the embodiments in FIG. 2, FIG. 6, FIG. 7, and FIG. 9. Thus, the repetitive description is omitted.

The description for the embodiment in FIG. 6 can also be applicable to the configuration of the accommodation space SP1, for example, the accommodation space SP1 is configured to accommodate the light emitting element L1. However, more particularly, a terminal of the accommodation space SP1 is the node N configured to receive the reference voltage signal VSS, and another terminal of the accommodation space SP1 s the node P. In some embodiments, it is open between the node P and the node N, and the accommodation space SP1 has extremely large effective resistor R1, for example, the order of magnitude of the effective resistor R1 is equal to or greater than 10 mega ohms. In some embodiments, it is short between the node P and the node N, and the accommodation space SP1 has extremely small effective resistor R1, for example, the order of magnitude of the effective resistor R1 is equal to or less than 100 ohms.

In addition, a terminal of the switch T8 is coupled with the node P. another terminal of the switch T8 is configured to output the detecting signal DT4 during the detecting period, and coupled with a terminal of the switch SW1 and a terminal of the switch SW2 at the node H. Another terminal of the switch SW1 and another terminal of the switch SW2 are configured to be coupled with the signal receiving terminal I and the voltage signal output terminal J of the electrical testing device EDD, respectively. The other configurations of the transistor T8 are the same as the embodiments in FIG. 2, FIG. 6, FIG. 7, and FIG. 9. Thus, the repetitive description is omitted.

In some embodiments, the switch SW1 includes the transistor T12 and the transistor T13. In these embodiments, the transistor T12 and the transistor T13 are coupled in series between the nodes H and I. In addition, the control terminal of the transistor T12 and the control terminal of the transistor T13 are configured to be coupled to the switch control terminal K of the electrical testing device EDD to receive the control signal Vsw1 from the electrical testing device EDD. Therefore, whether the switch SW1 is turned on or turned off is determined by the control signal Vsw1. When the control signal Vsw1 is at the voltage level VGH, the transistors T12-T13 are turned on, and correspondingly, the switch SW1 is turned on. On the contrary, when the control signal Vsw1 is at the voltage level VGL, the transistors T12-T13 is turned off, and correspondingly, the switch SW1 is turned off.

In some embodiments, the switch SW2 includes the transistor T14 and the transistor T15. In these embodiments, the transistor T14 and the transistor T15 are coupled in series between the nodes H and J. In addition, the control terminal of the transistor T14 and the control terminal of the transistor T15 are configured to be coupled to the switch control terminal L of the electrical testing device EDD to receive the control signal Vsw2 from the electrical testing device EDD. Therefore, whether the switch SW2 is turned on or turned off is determined by the control signal Vsw2. When the control signal Vsw2 is at the voltage level VGH, the transistors T14-T15 are turned on, and correspondingly, the switch SW1 is turned on. On the contrary, when the control signal Vsw2 is at the voltage level VGL, the transistors T14-T15 is turned off, and correspondingly, the switch SW2 is turned off.

In the embodiments mentioned above, the transistors T12-T15 can be P-type metal oxide semiconductor field effect transistors (PMOSs), N-type metal oxide semiconductor field effect transistors (NMOSs), the thin-film transistors (TFTs) or other different types of switch elements.

Figure 12:
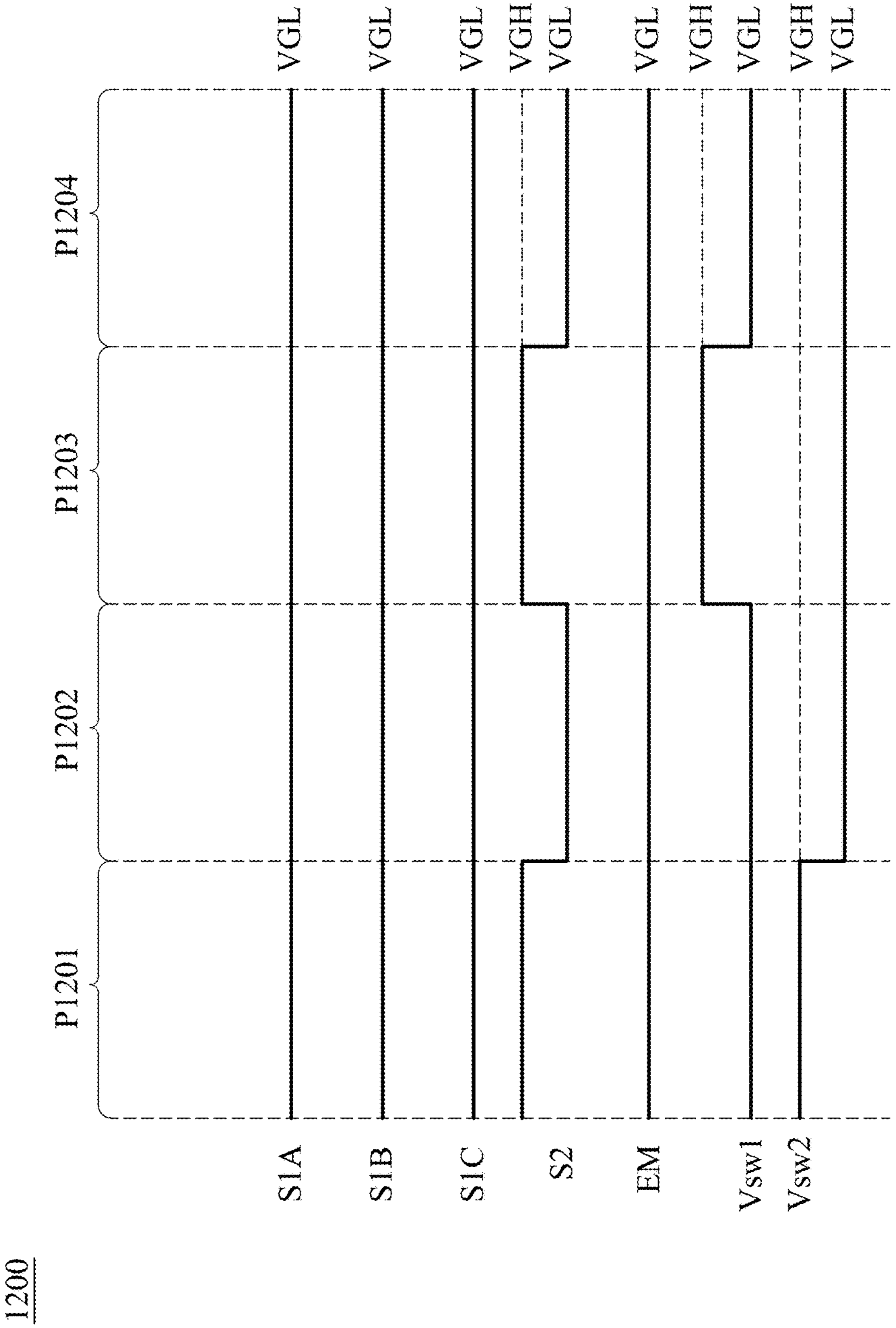
FIG. 12 illustrates a time sequence diagram of a detecting operation of the pixel driving circuit in FIG. 11 according to one embodiment of the present disclosure.

Reference is made to FIG. 11 and FIG. 12 together. FIG. 12 illustrates a time sequence diagram 1200 of a detecting operation of the pixel driving circuit 1100 in FIG. 11 according to one embodiment of the present disclosure. As shown in FIG. 12, the time sequence diagram 1200 includes the periods P1201-P1204 in order. In some embodiments, the time sequence diagram 1200 corresponds to the operations for different signals as shown in FIG. 11, such as the operations for the scan signals S1A, S1B, S1C, and S2, the light emitting signal EM, the control signal Vsw1 and the control signal Vsw2.

During the periods P1201-P1204, the scan signal S1A, the scan signal S1B, the scan signal S1C, and the scan signal S2, and the light emitting signal EM are maintained at the voltage level VGL. Therefore, the switches T1-T3, T6, T7, and T10 maintain turned off. In addition, the detect enable signal TE is maintained at the voltage level VGL (not shown in Figs.). Therefore, the switch T11 maintains turned off.

Particularly, during the period P1201, the scan signal S2 is maintained at the voltage level VGH, and thereby, the switch T8 is in the on state. The control signal Vsw1 is maintained at the voltage level VGL, and thereby, the switch SW1 is in the off state. The control signal Vsw2 is maintained at the voltage level VGH, and thereby, the switch SW2 is in the on state and electrically connects the electrical testing device EDD with the switch T8. The electrical testing device EDD transmits the reference voltage signal VR2 to the switch T8 through the voltage signal output terminal J and the switch SW2. After the switch T8 receives the reference voltage signal VR2, the switch T8 further provides the reference voltage signal VR2 to the node P. In similarity with the periods P402 and P802, the period P1201 can work as the reset period of the detecting operation shown in the time sequence diagram 400 or the light emitting operation shown in the time sequence diagram 800.

During the period P1202, the scan signal S2 is pulled down to the voltage VGL, and thereby, the switch T8 is turned off. In addition, the control signal Vsw2 is also pulled down to the voltage level VGL, and thereby, the switch SW2 is turned off. The period P1202 is the stand-by period without executing any operation.

During the period P1203, the scan signal S2 is pulled up to the voltage level VGH, and thereby, the switch T8 is turned on to receive the reference voltage signal VSS. The control signal Vsw1 is pulled up to the voltage level VGH, and thereby, the switch SW1 is turned on to electrically connect the electrical testing device EDD with the switch T8.

During the period P1203, the reference voltage VSS maintained at the voltage level Vss1 can be inputted in the node N to detect the electrical relation between the node P and the node N. Alternatively stated, the period P1203 is a detecting period. Furthermore, the transistor T8 outputs the detecting signal DT4 at the node H. The detecting signal DT4 is then transmitted to the electrical testing device EDD through the switch SW1 and the node I. Moreover, the electrical testing device EDD detects the detecting signal and generates the detecting result DR1. The detecting result DR1 can be a physical quantity associated with the electricity, such as voltage, a current, or resistivity, etc.

Moreover, the reference voltage signal VSS is adjusted from the voltage level Vss1 to the voltage level Vss2 that is different from the voltage level Vss1. In some embodiments, the voltage level Vss2 is lower than the voltage level Vss1. In some embodiments, the voltage level Vss2 is higher than the voltage level Vss1. For example, the voltage level Vss1 is 17 volts and the voltage level Vss2 is −7 volts. For example, the voltage level Vss1 is −7 volts and the voltage level Vss2 is 17 volts.

Moreover, the electrical testing device EDD detects the detecting signal DT4, and generates the detecting result DR2. Corresponding to the detecting result DR1, the detecting result DR2 can be a physical quantity associated with the electricity such as a voltage, a current, or a resistivity, etc. Alternatively stated, the detecting result DR1 and the detecting result DR2 are the same physical quantities associated with the electricity. Then, it is determined whether the electrical relation between the node N and the node P is an open circuit or a short circuit according to a difference between the detecting result DR1 and the detecting result DR2. Corresponding to the detecting result DR1 and the detecting result DR2, the difference can be a physical quantity associated with the electricity, such as the voltage, the current, or the resistivity, etc.

When the difference is greater than a difference threshold, it is determined that the electrical relation between the node N and the node P is a short circuit. The difference threshold can be determined according to the value of the difference of the circuit which has been ensured to have a short circuit. The difference threshold can be adjusted according to the measurement accuracy of the electrical testing device EDD.

In addition, in some embodiments, when the difference is greater than 0.01DR1 or 0.01DR2, it is determined that the electrical relation between the node N and the node P is a short circuit. In another embodiment, when the difference is greater than 0.1DR1 or 0.1DR2, it is determined that the electrical relation between the node N and the node P is a short circuit.

During the period P1204, the scan signal S2 is pulled down to the voltage level VGL, and thereby, the switch T8 is turned off. In addition, the control signal Vsw2 is also pulled down to the voltage level VGL, and thereby, the switch SW2 is turned off. Like the period P1202, the period P1204 is the stand-by period without executing any operation.

In some embodiments, the operation as during the period P1201 can be executed again after the period P1204. In some embodiments, the detecting operation is finished and the electrical testing device EDD can be separated from the pixel driving circuit 1100 after the period P1204. In this way, the electrical testing device EDD can be saved. In addition, when the pixel driving circuit 1100 goes wrong, the switch SW1 and the switch SW2 can be connected with the electrical testing device EDD again to detect where the short defect is. In some embodiments, the detecting operation is finished and the electrical testing device EDD, the switch SW1, and the switch SW2 can be separated from the pixel driving circuit 1100 after the period P1204. In this way, the electrical testing device EDD, the switch SW1, and the switch SW2 can be saved.

In some approaches, the μLED display circuit adopts the source follower to execute compensation and the threshold voltages of TFTs are compensated by the capacitive coupling. However, the parasitic capacitance is larger, which makes the compensation less accurate. In addition, the number of the TFTs through the conduction paths of μLEDs in the display circuit is larger, which makes the voltage across the pixel driving circuit increased and the power consumption correspondingly increased. Furthermore, in comparison with the LTPS TFTs, the oxide TFTs are more sensitive to the water vapor, the bias voltage, the temperature, etc., which makes the pixel current easily influenced by the variation of the threshold voltage to lead to the brightness non-uniformity of the display screen (i.e., mura).

In comparison with the approaches mentioned above, in some embodiments of the present disclosure, the problem of the brightness non-uniformity of the display screen is improved by diode connecting the switch T7 to compensate the threshold voltage of the switch T7. The driving current IL is not influenced by the reference voltage signal VSS, which reduces the difference of the supply voltage of the power cord between the far and near ends. The number of TFTs through the conduction path of the μLED is decreased to 2, which makes the power consumption lower and the circuit layout area increased. In addition, the LTPS TFTS are taken as the transistor type of the switches T6 and T7, which makes the circuit layout area decreased. In this way, the pixels per inch (PPI) are increased. Furthermore, the oxide TFTs are taken as the transistor type of the switches T1 and T2, which makes the leakage current decreased.

Although the present disclosure has been described in considerable detail with reference to certain embodiments thereof, but this does not intend to limit the present disclosure. It will be apparent to those skilled in the art that various modifications and variations can be made to the structure of the present application without departing from the scope or spirit of the disclosure. Therefore, what the present application covers shall depend on the scope defined by the following claims.

What is claimed is:

1. A display device, comprising:
a plurality of pixel driving circuits coupled in series, wherein a first pixel driving circuit of the plurality of pixel driving circuits comprises:
a first switch, wherein a first terminal of the first switch is configured to output a detecting signal, and a second terminal of the first switch is coupled with a first node;
a capacitor, wherein a first terminal of the capacitor is coupled with the first node, and a second terminal of the capacitor is coupled with a second node; and
an accommodation space, wherein a first terminal of the accommodation space is coupled with the second node, a second terminal of the accommodation space is configured to receive a reference voltage signal, and the accommodation space is configured to accommodate a light-emitting element after a detecting operation is executed,
wherein the reference voltage signal is adjusted and an electrical relation between the first terminal of the accommodation space and the second terminal of the accommodation space is determined according to the detecting signal, when the detecting operation is executed.

2. The display device of claim 1, wherein:
a control terminal of the first switch is configured to receive a first scan signal;
during a first period in the detecting operation,
the reference voltage signal has a first voltage level,
the first scan signal has a second voltage level, and
the detecting signal has a first detecting voltage level;
during a second period in the detecting operation,
the reference voltage signal has the second voltage level,
the detecting signal has a second detecting voltage level, and
the first scan signal has the second voltage level;
the first period is different from the second period; and
the first voltage level is different from the second voltage level.

3. The display device of claim 2, wherein:
the first detecting voltage level is roughly the same as the second detecting voltage level, when it is open between the first terminal of the accommodation space and the second terminal of the accommodation space; and
the first detecting voltage level is different from the second detecting voltage level, when it is short between the first terminal of the accommodation space and the second terminal of the accommodation space.

4. The display device of claim 2, wherein:
a second pixel driving circuit of the plurality of pixel driving circuits is configured to output the detecting signal, receive the reference voltage signal, and receive a second scan signal;
during a third period in the detecting operation,
each of the reference voltage signal and the first scan signal has the first voltage level, and
the second scan signal has the second voltage level;
during a fourth period in the detecting operation,
each of the reference voltage signal and the second scan signal has the second voltage level, and
the first scan signal has the first voltage level;
the first period and the third period are arranged in order; and
the second period and the fourth period are arranged in order.

5. The display device of claim 4, wherein:
the first detecting voltage level is roughly the same as the second detecting voltage level, when it is open between the first terminal of the accommodation space and the second terminal of the accommodation space; and
the first detecting voltage level is different from the second detecting voltage level, when it is short between the first terminal of the accommodation space and the second terminal of the accommodation space.

6. A detecting method of a display device, comprising:
during a first period,
providing a reference voltage signal having a first voltage level to a first node;
generating a detecting signal from a third node, according to a voltage level of a second node;

during a second period, adjusting the reference voltage signal to a second voltage level different from the first voltage level;

comparing a first detecting voltage level of the detecting signal during the first period with a second detecting voltage level of the detecting signal during the second period;

determining an electrical relation between the first node and the second node, according to a difference between the first detecting voltage level and the second detecting voltage level; and coupling a light-emitting element between the first node and the second node, when the electrical relation meets a default electrical relation, wherein a capacitor is coupled between the second node and the third node.

7. The detecting method of claim 6, wherein:

the first detecting voltage level is roughly the same as the second detecting voltage level and the electrical relation meets the default electrical relation, when it is open between the first node and the second node; and the first detecting voltage level is different from the second detecting voltage level, when it is short between the first node and the second node.

8. The detecting method of claim 6, further comprising:

outputting the detecting signal through a first switch coupled with the third node.

9. The detecting method of claim 8, further comprising:

providing a scan signal having the second voltage level to a control terminal of the first switch, during each of the first period and the second period.

10. The detecting method of claim 9, wherein:

the first detecting voltage level is roughly the same as the second detecting voltage level and the electrical relation meets the default electrical relation, when it is open between the first node and the second node; and the first detecting voltage level is different from the second detecting voltage level, when it is short between the first node and the second node.

11. A detecting method of a display device, comprising:

during a first period, turning on a first switch coupled between a: first terminal of an accommodation space and a node outputting a detecting signal;

turning on a second switch coupled between the node and an electrical testing device;

inputting a reference voltage signal maintaining at a first voltage level into a second terminal of an accommodation space; and detecting the detecting signal and generating a first detecting result, by the electrical testing device; and during a second period, adjusting the reference voltage signal from the first voltage level to a second voltage level that is different from the first voltage level;

detecting the detecting signal and generating a second detecting result, by the electrical testing device; and determining an electrical relation between the first terminal and the second terminal, according to a difference between the first detecting result and the second detecting result.

12. The detecting method of claim 11, further comprising:

turning off a third switch coupled with the node during the first period.

13. The detecting method of claim 11, further comprising:

determining the electrical relation between the first terminal and the second terminal is a short circuit, when the first detecting result is different from the second detecting result.

* * * * *